(12) United States Patent
Moore et al.

(10) Patent No.: US 10,974,465 B2
(45) Date of Patent: Apr. 13, 2021

(54) METHOD AND SYSTEM FOR GENERATING A LAYUP PLAN FOR FORMING A COMPOSITE LAMINATE

(71) Applicant: The Boeing Company, Chicago, IL (US)

(72) Inventors: Jeron D. Moore, Lynnwood, WA (US); Michael Kenneth-Que Louie, Renton, WA (US); Gagandeep Saini, Snohomish, WA (US); Luis A. Perla, Sammamish, WA (US); Brice Aaron Johnson, Federal Way, WA (US); Stewart James Ibbotson, Bothell, WA (US); Robert G. Meyer, Renton, WA (US)

(73) Assignee: The Boeing Company, Chicago, IL (US)

( * ) Notice: Subject to any disclaimer, the term of this patent is extended or adjusted under 35 U.S.C. 154(b) by 326 days.

(21) Appl. No.: 16/013,506

(22) Filed: Jun. 20, 2018

(65) Prior Publication Data

US 2019/0389149 A1    Dec. 26, 2019

(51) Int. Cl.
  *B32B 41/00*   (2006.01)
  *B29C 70/38*   (2006.01)
  *B29L 31/30*   (2006.01)
(52) U.S. Cl.
  CPC ..... *B29C 70/382* (2013.01); *B29L 2031/3076* (2013.01)

(58) Field of Classification Search
  CPC ....... B29C 70/382; B29C 70/38; B29C 70/30; B29L 2031/3076
  USPC .......................... 156/64, 350, 351, 378, 379
  See application file for complete search history.

(56) References Cited

U.S. PATENT DOCUMENTS

| 4,696,707 A | 9/1987 | Lewis |
| 8,165,702 B2 | 4/2012 | Wyatt et al. |
| 9,114,575 B2 | 8/2015 | Johnson et al. |
| 2006/0073309 A1 | 4/2006 | Hogg |
| 2012/0076973 A1 | 3/2012 | Guzman et al. |
| 2016/0250812 A1 | 9/2016 | Roach et al. |
| 2018/0017258 A1 | 1/2018 | Stieg et al. |

FOREIGN PATENT DOCUMENTS

EP     2749869     7/2014

*Primary Examiner* — Michael N Orlando
*Assistant Examiner* — Joshel Rivera
(74) *Attorney, Agent, or Firm* — Haynes and Boone, LLP

(57) ABSTRACT

A method and system for forming a composite laminate. A layup plan is generated for laying up a plurality of plies having a plurality of merge zones, each ply of the plurality of plies having a corresponding merge zone at which ends of a first plurality of tows for each ply and ends of a second plurality of tows for each ply meet. The locations of the plurality of merge zones are offset relative to each other through a thickness of the composite laminate. The plurality of plies is then laid up according to the layup plan to form a composite laminate.

33 Claims, 12 Drawing Sheets

METHOD AND SYSTEM FOR GENERATING A LAYUP PLAN FOR FORMING A COMPOSITE LAMINATE

CROSS-REFERENCE TO RELATED APPLICATION

This application is related to U.S. patent application Ser. No. 16/013,548, entitled "Automated Manufacture of Complex Contoured Composite Parts," filed Jun. 20, 2018, and which is hereby incorporated by reference in its entirety.

FIELD

This disclosure generally relates to systems and methods for manufacturing composite parts and, more particularly, to automated systems and methods for laying up plies to form a complex, contoured composite part.

BACKGROUND

A composite laminate may be formed with multiple plies. A ply may be formed by laying up tows. As one example, multiple parallel tows may be laid up on a surface of a tool to form a single ply. Each of these tows may be, for example, a strip of composite tape or a strip of composite material. A tow may have a width of, for example, about 0.1 inches, about 0.3 inches, about 0.5 inches, or some other width. The tows may be laid up in bands (or courses), with each band including one or more tows. Each tow within a band may run the entire length of the band or only a portion of the band.

Different layup systems may be used to form a composite ply. In one example, a computer numerical control (CNC) machine is used to automate the process of laying up multiple plies to form a composite laminate. In some cases, numerically controlled automated fiber placement (AFP) machines are used to layup composite laminate structures including, but not limited to, large-scale, complex-shaped, composite laminate structures. For example, in the aircraft industry, AFP machines may be used to layup composite airframe components, such as spars and stringers. These AFP machines typically have one or more material placement heads that are manipulated to apply and compact multiple prepreg tows on a mandrel or similar tool. In some cases, tows are applied along curved paths to form nonlinear features of a structure.

The complex contours of some spars and stringers may pose challenges to using automated fiber placement machines. AFP machines may have difficulties applying tows over curves (or radii). Further, some currently available methods and systems for laying up plies to form complex contour composite parts may produce a greater number of inconsistencies, such as gaps and overlaps, than desired through the thickness of the composite laminate. Therefore, it would be desirable to have a method and apparatus that take into account at least some of the issues discussed above, as well as other possible issues.

SUMMARY

In one illustrative embodiment, a method is provided for forming a composite laminate. A layup plan is generated for laying up a plurality of plies having a plurality of merge zones, each ply of the plurality of plies having a corresponding merge zone at which ends of a first plurality of tows for each ply and ends of a second plurality of tows for each ply meet. The locations of the plurality of merge zones are staggered through a thickness of the composite laminate. The plurality of plies is then laid up according to the layup plan to form a composite laminate.

In another illustrative embodiment, a layup plan is computed for laying up a plurality of plies. A portion of the layup plan corresponding to a selected ply of the plurality of plies includes a first path for laying up a first plurality of tows and a second path for laying up a second plurality of tows. The first path and the second path are at least one of non-parallel and nonlinear. A laying up of the first plurality of tows according to the first path and the second plurality of tows according to the second path is modeled to thereby form the selected ply having a merge zone at which first ends of the first plurality of tows and second ends of the second plurality of tows meet. Overlaps of the first ends and the second ends and gaps between the first ends and the second ends formed within the merge zone of the selected ply are identified. A portion of the layup plan for a next ply of the plurality of plies is modified based on the overlaps and the gaps identified such that the next ply has a merge zone offset from the merge zone of the selected ply.

In yet another illustrative embodiment, a system comprises a control system and a tow placement system. The control system generates a layup plan for laying up a plurality of plies having a plurality of merge zones, each ply of the plurality of plies having a corresponding merge zone at which ends of a first plurality of tows for each ply and ends of a second plurality of tows for each ply meet. The locations of the plurality of merge zones are offset relative to each other through a thickness of a composite laminate to be formed. The tow placement system is controlled by the control system to lay up the plurality of plies according to the layup plan to form the composite laminate.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings.

DETAILED DESCRIPTION

The illustrative embodiments described below provide methods and apparatuses for forming a composite object having a complex contour shapes. In particular, the illustrative embodiments provide methods and apparatuses for manufacturing a composite laminate having a complex contour shape and an optimized amount of overlaps and gaps between plies of the composite laminate.

In one illustrative embodiment, two sections of tows (e.g., tape) are laid up over a tool or part along non-parallel paths such that these sections converge and meet at a merge zone to form a single ply. For example, these two sections may have different orientations when laid up over the tool. The layup of each section may include steering, by an automated fiber placement (AFP) system or machine, the tows that form each section along a path that is substantially parallel to a corresponding contour or curve. The corresponding contours for the two sections may be non-parallel along at least a portion of the contours. The location of the merge zone relative to the tool or part may be managed using computer programming, such as numerically controlled (NC) programming, to optimize the quality of the ply, as well as the final composite laminate.

By forming a ply using two sections of tows that converge at a merge zone within the ply, the quality of the ply may be improved. Thus, the overall quality and structural performance of the composite laminate formed by the ply may be improved.

Figure 1:
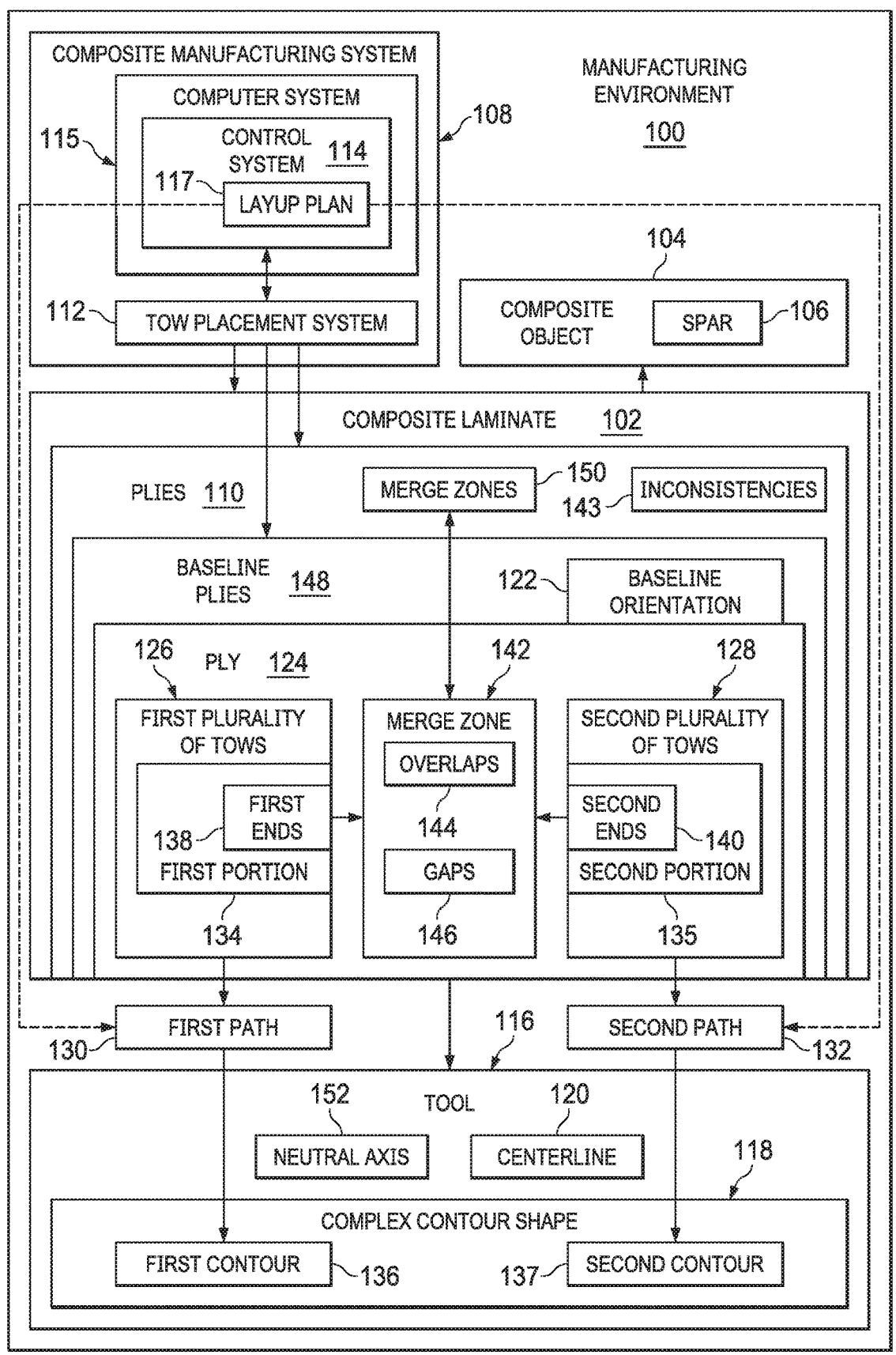
FIG. 1 is a block diagram of a manufacturing environment in accordance with an illustrative embodiment.

With reference now to FIG. 1, a block diagram of a manufacturing environment is depicted in accordance with an illustrative embodiment. Manufacturing environment 100 may be any environment in which composite laminate 102 is manufactured. Composite laminate 102 may be used to form composite object 104, which may take any number of different forms. Composite object 104 may also be referred to as a composite part.

Composite object 104 may be any object or structure formed out of or fabricated from composite material. In some cases, composite object 104 may be fully formed of composite material. In other examples, only a portion of composite object 104 may be formed from composite material.

In one illustrative example, composite object 104 takes the form of spar 106. In other illustrative examples, composite object 104 may take the form of a beam, a frame, a rib, an intercostal, a stringer, a wing structure, a fuselage structure, a stabilizer structure, a blade, some other composite aircraft structure, or some other type of composite structure.

Composite manufacturing system 108 may be used to manufacture composite laminate 102. As depicted, composite laminate 102 may be comprised of a plurality of plies 110. Each ply of plies 110 may be comprised of multiple tows, each of which may be comprised of a composite material.

Composite manufacturing system 108 may include tow placement system 112 and control system 114. In one illustrative example, tow placement system 112 takes the form of an automated fiber placement system, which may be a computer numerically controlled (CNC) machine. Tow placement system 112 may be controlled by control system 114. In other words, tow placement system 112 may be controlled using numerically controlled (NC) programming. This programming may be controlled by control system 114. Control system 114 may be part of or separate from tow placement system 112. In some cases, a portion of control system 114 may be part of tow placement system 112, while another portion of control system 114 may be separate from tow placement system 112.

Control system 114 may be implemented using software, hardware, firmware, or a combination thereof. When software is used, the operations performed by control system 114 may be implemented using, for example, without limitation, program code configured to run on a processor unit. When firmware is used, the operations performed by control system 114 may be implemented using, for example, without limitation, program code and data and stored in persistent memory to run on a processor unit.

When hardware is employed, the hardware may include one or more circuits that operate to perform the operations performed by control system 114. Depending on the implementation, the hardware may take the form of a circuit system, an integrated circuit, an application specific integrated circuit (ASIC), a programmable logic device, or some other suitable type of hardware device configured to perform any number of operations. A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In one illustrative embodiment, control system 114 is implemented using computer system 115. Computer system 115 may include a single computer or multiple computers in communication with each other.

Tow placement system 112 is controlled to lay up plies 110 over tool 116 to form composite laminate 102. Tool 116 may also be referred to as a mandrel or a part. Tool 116 has complex contour shape 118. Complex contour shape 118 may mean, for example, that tool 116 has one or more surfaces with at least two different curvatures. As one illustrative example, when composite object 104 to be formed is spar 106, tool 116 may have at least three layup surfaces, with a first layup surface for a first flange of spar 106, a second layup surface for a second flange of spar 106, and a third layup surface for a web of spar 106 that connects the two flanges.

In these illustrative examples, tool 116 has centerline 120. Centerline 120 may be the centerline that runs along the length of tool 116. Centerline 120 may be a straight line in a single direction, may curve, or may change direction one or more times. In one illustrative example, when composite object 104 takes the form of spar 106, centerline 120 may be located along a length of the web of spar 106.

In some illustrative examples, each of plies 110 may have a same orientation. In other illustrative examples, plies 110 are laid up having different orientations relative to each other. In one illustrative example, plies 110 may have four different orientations relative to tool 116. These orientations may be relative to, for example, centerline 120 of tool 116, an axis that lies along at least a portion of centerline 120, or some other axis. A portion of plies 110 may be of baseline orientation 122 relative to tool 116. In these illustrative examples, baseline orientation 122 may correspond to what is traditionally considered the 0 degree orientation in composite manufacturing. In other words, the portion of plies 110 having baseline orientation 122 may be the portion of plies 110 that would traditionally be oriented at 0 degrees relative to centerline 120 through tool 116.

As one illustrative example, a first portion of plies 110 may be of baseline orientation 122; a second portion of plies 110 may have a 45 degree orientation relative to baseline orientation 122; a third portion of plies 110 may have a 90 degree orientation relative to baseline orientation 122; and a fourth portion of plies 110 may have a −45 degree orientation relative to baseline orientation 122. In some cases, the orientations of the plies within composite laminate 102 may follow a sequence (e.g., baseline, 45 degrees, 90 degrees, and −45 degrees) that repeats.

In these illustrative examples, because tool 116 has complex contour shape 118, tow placement system 112 may be controlled to lay up the portion of plies 110 of baseline orientation 122 in a different manner than the other orientations. Ply 124 is an example of one of plies 110 having baseline orientation 122 in composite laminate 102. Tow placement system 112 uses two different sections of tows to form ply 124.

For example, tow placement system 112 is controlled to lay up first plurality of tows 126 and second plurality of tows 128 over tool 116 according to first path 130 and second path 132, respectively, to form ply 124. First path 130 and second path 132 may be identified specifically by layup plan 117 for ply 124.

First plurality of tows 126 and second plurality of tows 128 are laid up such that at least first portion 134 of first plurality of tows 126 runs non-parallel to at least second portion 135 of second plurality of tows 128. In other words, at least a portion of first path 130 and a corresponding portion of second path 132 may be non-parallel. In some cases, first portion 134 and second portion 135 may be all of first plurality of tows 126 and second plurality of tows 128, respectively.

First path 130 may follow first contour 136 of complex contour shape 118, while second path 132 may follow second contour 137 of complex contour shape 118. More specifically, first path 130 may run substantially parallel to first contour 136, while second path 132 may run substantially parallel to second contour 137. First contour 136 may be a first curve of one side of tool 116 that runs down a length of tool 116 and second contour 137 may be a different, second curve of another side of tool 116 that runs down the length of tool 116. As one illustrative example, first path 130 may run parallel to the first curve along a length of tool 116, while second path 132 may run parallel to the second curve along a length of tool 116.

Further, with first path 130 and second path 132 being non-parallel at least along a portion of these paths, first plurality of tows 126 and second plurality of tows 128 are laid up such that first ends 138 of first portion 134 of first plurality of tows 126 and second ends 140 of second portion 135 of second plurality of tows 128 meet at merge zone 142 to form ply 124. Each of first ends 138 and second ends 140 may be an end portion of the corresponding tow. First plurality of tows 126 may be laid up as one or more bands (or courses), each band including any number of tows. Similarly, second plurality of tows 128 may be laid up as one or more bands (or courses), each band including any number of tows.

In this manner, ply 124 is created as two different sections (or halves) that meet at merge zone 142. Merge zone 142 includes the boundary or seam at which the two different sections meet. Merge zone 142 may also include a portion of ply 124 extending on either side from this boundary or seam. Specifically, these two sections of different orientations converge at merge zone 142 to form a single orientation for engineering purposes, baseline orientation 122. Merge zone 142 includes an interface between these two different sections. In other words, merge zone 142 includes the seam or boundary formed between first plurality of tows 126 and second plurality of tows 128. In some cases, this boundary may be referred to as the merge boundary. In some embodiments, the merge boundary of merge zone 142 may be the line, which may be straight or curved, that traces the seam formed at the interface between first plurality of tows 126 and second plurality of tows 128.

In one illustrative example, merge zone 142 may be substantially parallel to centerline 120. Merge zone 142 includes inconsistencies 143. Inconsistencies 143 may include overlaps 144 and gaps 146.

For example, merge zone 142 may include overlaps 144 of at least a portion of first ends 138 and at least a portion of second ends 140. Further, merge zone 142 may include gaps 146 between at least a portion of first ends 138 and at least a portion of second ends 140. Tow placement system 112 may be controlled to optimize merge zone 142 by optimizing overlaps 144 and gaps 146. For example, optimizing overlaps 144 may include trimming or cutting first ends 138 and second ends 140 to ensure the desired amount of overlaps 144. In some cases, first ends 138 and second ends 140 may be trimmed to ensure about 50 percent overlap. Optimizing overlaps 144 may include optimizing the total area of overlaps 144. Optimizing gaps 146 may include reducing the total area of gaps 146 to within selected tolerances while also optimizing overlaps 144.

In these illustrative examples, each of plies 110 to have baseline orientation 122 is laid up in a manner similar to that described above for ply 124. For example, baseline plies 148 may be the portion of plies 110 having baseline orientation 122. Baseline plies 148 may have merge zones 150. In other words, each of baseline plies 148 may be formed having a corresponding one of merge zones 150, similar to merge zone 142 described above.

In some illustrative examples, baseline plies 148 may be formed such that merge zones 150 are staggered or offset relative to each other. For example, merge zones 150 may be staggered or offset with respect to the direction substantially perpendicular to centerline 120 of tool 116. Tow placement system 112 may be controlled to stagger or offset merge zones 150 according to a particular sequence or a random sequence. Control system 114 controls the locations of merge zones 150 of baseline plies 148 to reduce or eliminate the number of gaps and/or overlaps within merge zones 150 that are directly stacked on top of each other. In some illustrative examples, the positioning of merge zones 150 within composite laminate 102 may be based at least partially on the requirements for the surface of composite laminate 102.

For example, tow placement system 112 may lay up each of baseline plies 148 such that the locations of merge zones 150 are shifted or spaced apart in the horizontal (or cross-sectional) direction. This spacing may be, for example, between about 0.1 inches and about 0.8 inches. In some cases, the spacing may be about 0.25 inches, or about 0.5 inches. Two adjacent baseline plies (e.g., a pair of baseline plies without any other baseline plies in between them), however, may be spaced apart much further, up to, for example, 5 inches, 7 inches, or even 10 inches apart.

Further, merge zones 150 may be centered around or symmetrically staggered relative to neutral axis 152 of composite object 104 being formed. Neutral axis 152 may be the axis in a cross-section of composite object 104 along which there are no longitudinal stresses or strains. In some cases, merge zones 150 may be staggered similarly on either side of neutral axis 152. In other illustrative examples, merge zones 150 may be staggered relative to neutral axis 152 or balanced around neutral axis 152 in some other manner.

In these illustrative examples, the various merge zones 150 may be "offset" horizontally, vertically, angularly, or a combination thereof, relative to each other and relative to composite laminate 102. Two merge zones may be angularly offset by having different orientations relative to each other. For example, two merge zones may be angularly offset by having different orientations with respect to a horizontal plane through composite laminate 102. In some cases, the orientations of the two merge zones may crisscross or intersect when considered with respect to the horizontal plane.

As one illustrative example, a first merge zone of a first ply has a merge boundary with a first orientation relative to centerline 120, while a second merge zone of a second ply has a second merge boundary with a second orientation relative to centerline 120. The first and second orientations may be different such that the two merge boundaries appear to crisscross or otherwise intersect when viewed with respect to a horizontal plane.

In these illustrative examples, tow placement system 112 lays up plies 110 to form composite laminate 102 according to layup plan 154. In particular, layup plan 154 may be computed by control system 114 and used to control operation of tow placement system 112. Layup plan 154 may also be referred to as a layup program, layup control program, or control program. In one or more embodiments, layup plan 154 includes information for controlling the layup of each of plies 110. In some cases, layup plan 154 includes information for controlling the layup of only a portion of plies 110.

Layup plan 154 may include, for example, without limitation, the orientations at which plies 110 are to be laid up, start and stop times, locations at which tows are to be cut, total applied bandwidth, angular path variations, trace path variations, ply boundaries, other types of information, or a combination thereof. Further, layup plan 154 may identify and/or be based on end parameters or goals for composite laminate 102, parameters based on the loads expected for composite object 104, the number of plies 110 needed for composite laminate 102, the orientations for plies 110, the orientations of the various sections of tows used to form single plies of plies 110, a desired percentage of overlaps, a desired percentage of gaps, a desired overlap to gap ratio, locations for merge zones 150, a location of neutral axis 152, a location of centerline 120, the desired relationships between merge zones 150 from ply to ply, or a combination thereof.

In some cases, layup plan 154 may also identify a curvature for one or more of merge zones 150. In some cases, layup plan 154 identifies the location of each of merge zones 150 relative to neutral axis 152.

The locations of merge zones 150 within composite laminate 102 may be selected based on a variety of parameters, including desired features or parameters for composite laminate 102. For example, the locations of merge zones 150 may be selected based on a desired surface quality of composite laminate 102, a desired laminate thickness for composite laminate 102, a desired load carrying capability for composite laminate 102, a desired strength of composite laminate 102, and other such factors.

The illustration of manufacturing environment 100 in FIG. 1 is not meant to imply physical or architectural limitations to the manner in which an illustrative embodiment may be implemented. Other components in addition to or in place of the ones illustrated may be used. Some components may be optional. Further, the blocks are presented to illustrate functional components. One or more of these blocks may be combined, divided, or combined and divided into different blocks when implemented in an illustrative embodiment.

As described above, in some cases, merge zone 142 may be substantially parallel to centerline 120, even when centerline 120 is curved. Thus, merge zone 142 may be curved. In some illustrative examples, merge zone 142 may be substantially parallel to neutral axis 152. In still other embodiments, merge zone 142 may not be substantially parallel to either centerline 120 or neutral axis 152.

Figure 2:
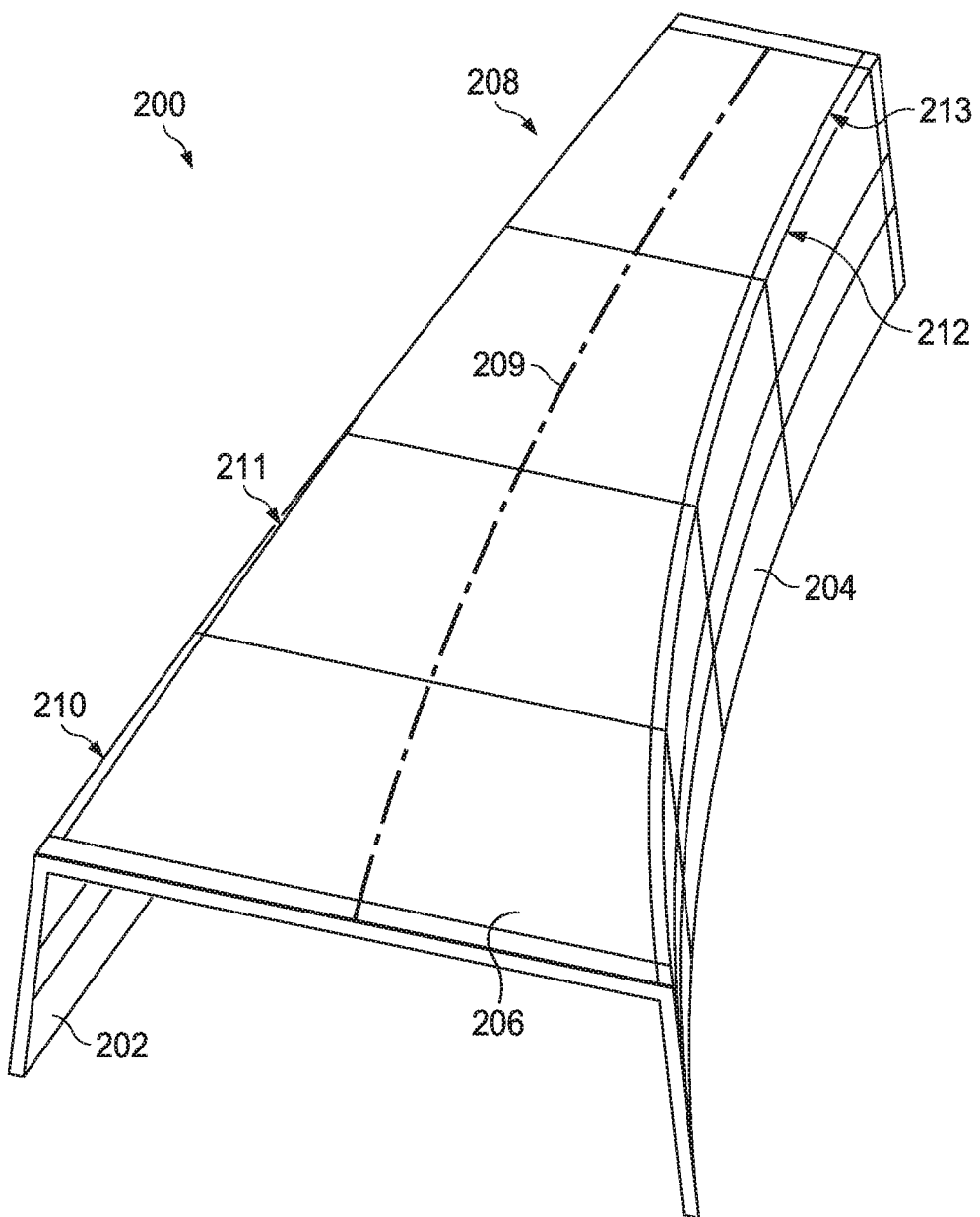
FIG. 2 is an illustration of a tool having a complex contour shape in accordance with an illustrative embodiment.

With reference now to FIG. 2, an illustration of a tool having a complex contour shape is depicted in accordance with an illustrative embodiment. Tool 200 is an example of one implementation for tool 116 in FIG. 1. In this illustrative example, tool 200 may be used for laying up a composite laminate to form ultimately a spar, such as spar 106 in FIG. 1. In this illustrative example, tool 200 may be a mandrel.

Tool 200 includes flanged portion 202, flanged portion 204, and web portion 206. In some illustrative examples, web portion 206 may have a substantially flat surface or contour. In some cases, web portion 206 may be substantially flat but may be curved at the interfaces between web portion 206 and flanged portion 202 and flanged portion 204. In still other illustrative examples, web portion 206 may have a curved surface or contour. The curved surface or contour may include multiple curves or differently shaped contours. For example, web portion 206 may have curved portions with different radii of curvature. In one illustrative example, web portion 206 may have a curved surface that has a changing radius of curvature along a length of at least a portion of web portion 206.

Web portion 206 connects flanged portion 202 and flanged portion 204. Flanged portion 202, flanged portion 204, and web portion 206 may be shaped for forming the first flange, the second flange, and the web, respectively, of a spar, such as spar 106 in FIG. 1.

Tool 200 has complex contour shape 208, which may be an example of one implementation for complex contour shape 118 in FIG. 1, and centerline 209. In this illustrative example, tool 200 has first contour 210 and second contour 212. As depicted, first contour 210 and second contour 212 may be non-parallel. Specifically, first contour 210 may have a different curvature than second contour 212.

First contour 210 is formed at interface 211 between flanged portion 202 and web portion 206. Second contour 212 is formed at interface 213 between flanged portion 204 and web portion 206. Interface 211 between flanged portion 202 and web portion 206 and interface 213 between flanged portion 204 and web portion 206 may each have a relatively small radius of curvature. In some cases, each of these interfaces may be referred to as having a "tight" radius.

In some illustrative examples, interface 211 and/or interface 213 may have a cross-sectional profile that forms a circular arc or near-circular arc. In other illustrative examples, interface 211 and interface 213 may each have a cross-sectional profile that is a different type of arc.

Figure 3:
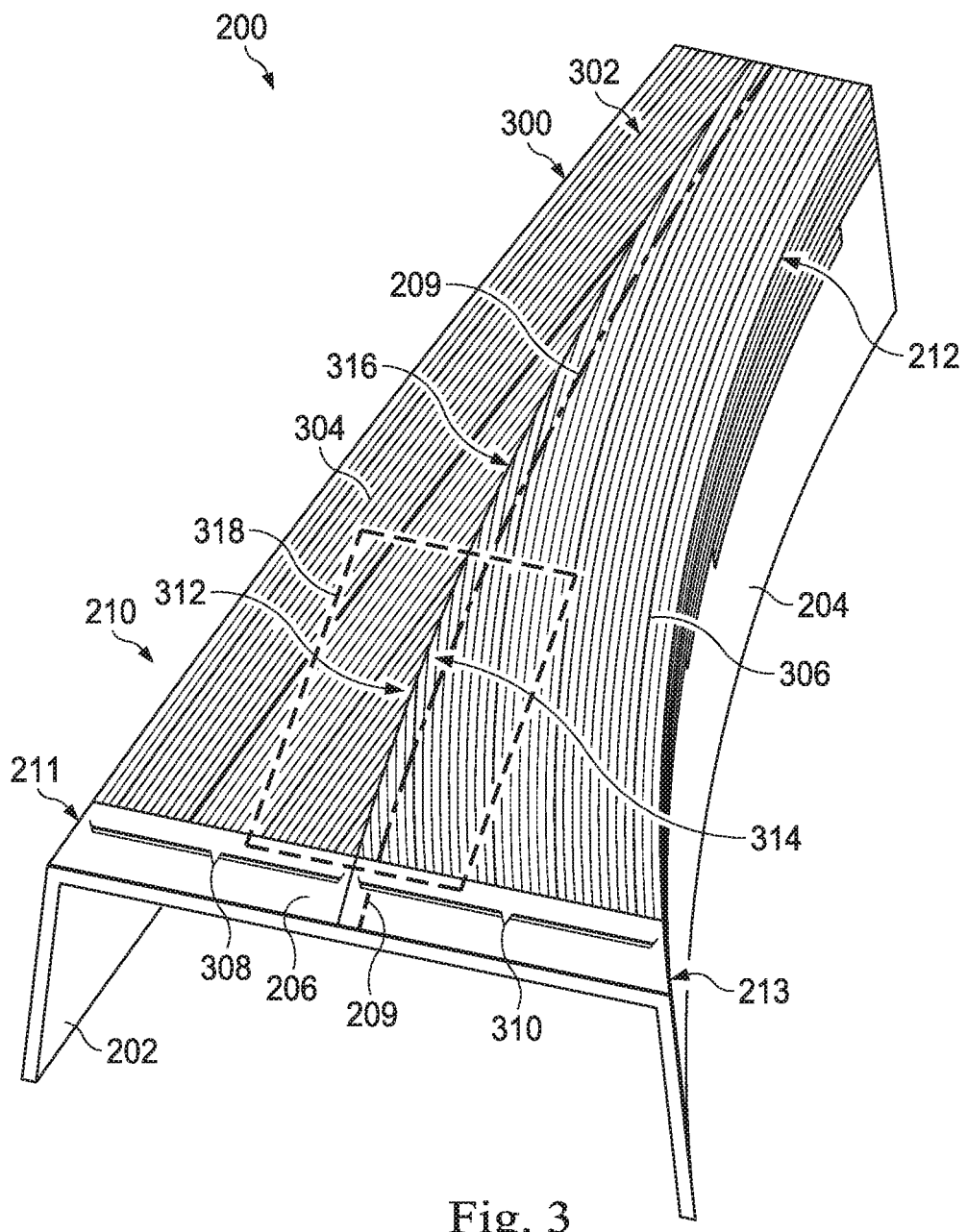
FIG. 3 is an illustration of a ply laid up over the tool from FIG. 2 in accordance with an illustrative embodiment.

With reference now to FIG. 3, an illustration of a ply laid up over tool 200 from FIG. 2 is depicted in accordance with an illustrative embodiment. Ply 300 is an example of one implementation for ply 124 in FIG. 1. In particular, ply 300 is a baseline ply of baseline orientation 302.

Ply 300 is formed by section 304 and section 306. Section 304 comprises first plurality of tows 308, which may be an example of one implementation for first plurality of tows 126 in FIG. 1. Section 306 comprises second plurality of tows 310, which may be an example of one implementation for second plurality of tows 128 in FIG. 1.

In this illustrative example, first plurality of tows 308 has been laid up over tool 200 along a first path that is substantially parallel to first contour 210 of tool 200. In other words, first plurality of tows 308 may be laid up with a generally 0-degree orientation relative to first contour 210. Depending on first contour 210, the path along which first plurality of tows 308 of section 304 is steered may be linear or curved. In some cases, section 304 is steered just offset from the 0-degree orientation relative to first contour 210. For example, section 304 may be steered such that first plurality of tows 308 are oriented about ±0.5 degrees, ±1.0 degrees, ±2.0 degrees, or some other number of degrees just offset from the 0-degree orientation relative to first contour 210. Whether or not section 304 is offset may depend on the orientation selected for the corresponding section of the previously laid up ply or the next ply to be laid up.

Second plurality of tows 310 has been laid up over tool 200 along a second path that is substantially parallel to second contour 212 of tool 200. In other words, first plurality of tows 308 may be laid up with a generally 0-degree orientation relative to second contour 212. Depending on second contour 212, the path along which second plurality of tows 310 of section 306 is steered may be linear or curved.

In some cases, section 306 is steered just offset from the 0-degree orientation relative to second contour 212. For example, section 306 may be steered such that second plurality of tows 310 are oriented about ±0.5 degrees, ±1.0 degrees, ±2.0 degrees, or some other number of degrees just offset from the 0-degree orientation relative to second contour 212. Whether or not section 306 is offset may depend on the orientation selected for the corresponding section of the previously laid up ply or the next ply to be laid up.

These two paths along first contour 210 and second contour 212, however, are non-parallel. Thus, first ends 312 of first plurality of tows 308 meet second ends 314 of second plurality of tows 310 at merge zone 316.

Merge zone 316 is an example of one implementation for merge zone 142 in FIG. 1. In this illustrative example, merge zone 142 is substantially parallel to but offset from centerline 209 of tool 200. In other illustrative examples, merge zone 142 may lie substantially along centerline 209 of tool 200. Portion 318 of merge zone 316 is shown enlarged in FIG. 4 below.

The tows in first plurality of tows 308 are substantially parallel to each other. Similarly, the tows in second plurality of tows 310 are substantially parallel to each other.

First plurality of tows 308 following first contour 210 may provide the smoothest curve and best layup for first plurality of tows 308 over tool 200. Similarly, second plurality of tows 310 following second contour 212 may provide the smoothest curve and best layup for second plurality of tows 310 over tool 200. Thus, the merging of first plurality of tows 308 and second plurality of tows 310 may form a smoother and higher quality ply 300. In other words, by following the contours of tool 200 from the outer portions of tool 200 inwards towards centerline 209 of tool 200, a higher quality ply 300, and ultimately composite laminate, may be formed.

In particular, orienting first plurality of tows 308 at about 0 degrees relative to first contour 210 and second plurality of tows 310 at about 0 degrees relative to second contour 212 may result in a higher quality ply 300. With other plies laid up in a manner similar to ply 300, the composite laminate and thereby, spar, that is formed may be better suited to carry tension or compression loads transmitted from the flanges.

Further, laying up ply 300 by laying up section 304 and section 306 as described above may allow tows within ply 300 to run continuously down the length of tool 200. Further, this type of layup allows easier ply-by-ply layup of a composite laminate over tool 200.

Figure 4:
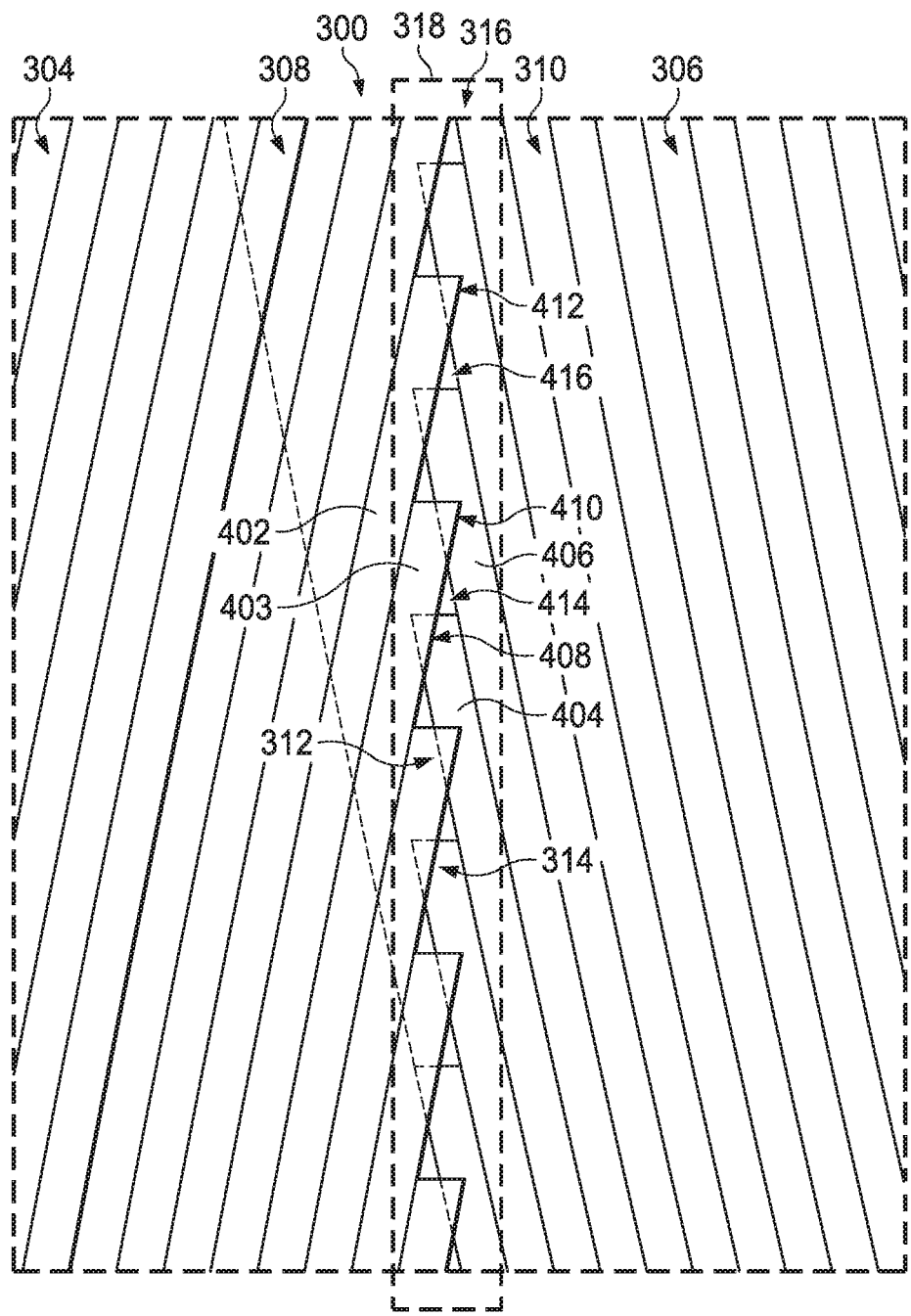
FIG. 4 is an illustration of a portion of the merge zone from FIG. 3 in accordance with an illustrative embodiment.

With reference now to FIG. 4, an illustration of portion 318 of merge zone 316 from FIG. 3 is depicted in accordance with an illustrative embodiment. As depicted, first plurality of tows 308 meets second plurality of tows 310 at merge zone 316. Specifically, first ends 312 of first plurality of tows 308 meet second ends 314 of second plurality of tows 310 at merge zone 316. The portion of first plurality of tows 308 shown has a first orientation 400 that is different from a second orientation 401 of second plurality of tows 310.

In this illustrative example, first plurality of tows 308 includes tow 402 and tow 403. Second plurality of tows 310 includes tow 404 and tow 406. Tow 402 and tow 403 meet tow 404 and tow 406 within merge zone 316. Overlap 408 is created between tow 403 and tow 404 and overlap 410 is created between tow 403 and tow 406. Overlap 408 and overlap 410 may be examples of overlaps 412 created by first plurality of tows 308 and second plurality of tows 310. Overlaps 412 may be an example of one implementation for overlaps 144 described in FIG. 1. In some illustrative examples, overlaps 412 may have triangular shapes or triangular-type shapes, as depicted.

Gap 414 is created between tow 403, tow 404, and tow 406. Gap 414 is an example of one of gaps 416 formed between first plurality of tows 308 and second plurality of tows 310. Gaps 416 may be an example of one implementation for gaps 146 described in FIG. 1. In some illustrative examples, gaps 416 may have triangular shapes or triangular-type shapes.

First ends 312 of first plurality of tows 308 and second ends 314 of second plurality of tows 310 may be trimmed against each other to ensure a desired amount of overlap. For example, first ends 312 of first plurality of tows 308 and second ends 314 of second plurality of tows 310 may be cut to provide a desired amount of overlap and to minimize the gaps between first plurality of tows 308 and second plurality of tows 310. In one illustrative example, first ends 312 and second ends 314 are cut to provide about 50 percent overlap or coverage within merge zone 316. In other illustrative examples, first ends 312 and second ends 314 may be cut to provide an overlap or coverage within merge zone 316 between about 25 percent and about 75 percent. The percentage of overlap or coverage selected may be based on, for example, a desired strength and/or load-carrying capacity for both ply 300 and the composite laminate to be formed with ply 300.

Figure 5A:
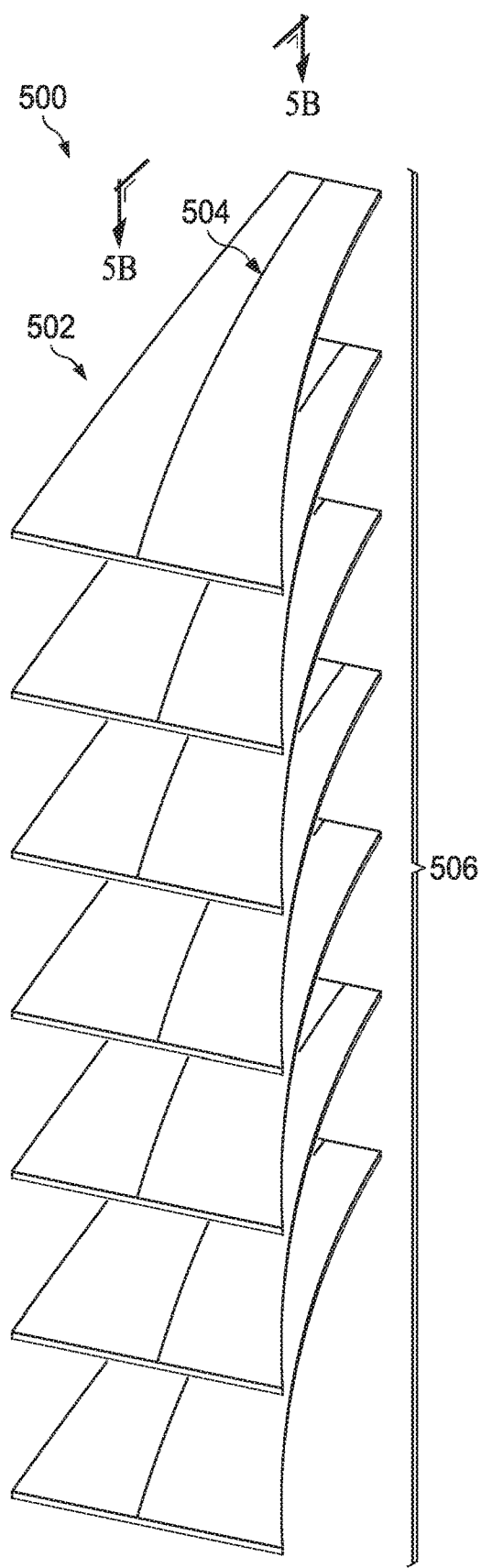
FIGS. 5A and 5B are illustrations of a composite laminate in accordance with an illustrative embodiment.
Figure 5B:
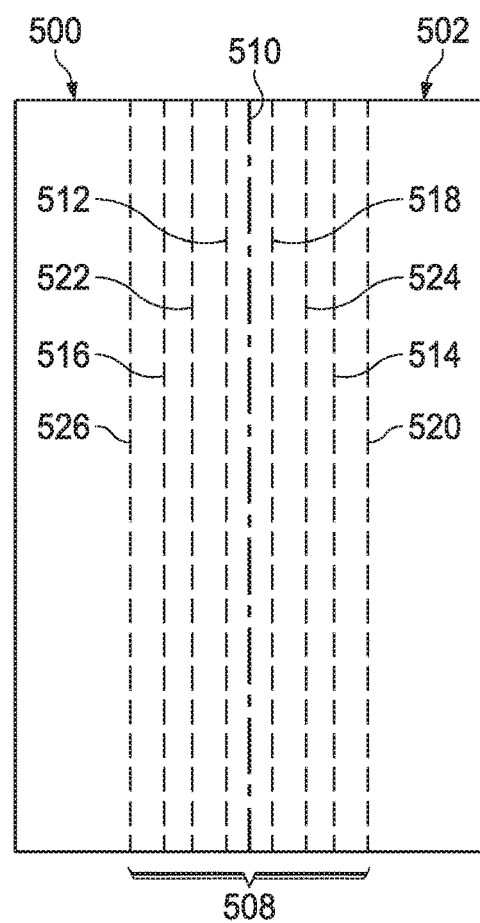

With reference now to FIGS. 5A and 5B, illustrations of a composite laminate are depicted in accordance with an illustrative embodiment. In FIG. 5A, an exploded isometric view of composite laminate 500 is depicted. Composite laminate 500 is an example of one implementation for composite laminate 102 in FIG. 1. Composite laminate 500 includes plies 502, which may be an example of one implementation for plies 110 in FIG. 1.

In this illustrative example, each of plies 502 is a baseline ply of a baseline orientation. Further, plies 502 include ply 300 from FIG. 3. In other illustrative examples, plies 502 may include other plies of other orientations.

Plies 502 have merge zones 504, which may be an example of one implementation for merge zones 150 in FIG. 1. As depicted, when plies 502 are stacked, merge zones 504 are horizontally offset from each other. In this illustrative example, merge zones 504 may be substantially parallel to each other but offset relative to each other. In other words, merge zones 504 may be staggered.

In other illustrative examples, however, two or more of merge zones 504 may be non-parallel. In some embodiments, one merge zone may crisscross or horizontally intersect with another merge zone. For example, two or more merge zones may be angularly offset relative to the horizontal plane. In some cases, the horizontal distance between two merge zones may be substantially constant or may vary along the lengths of the merge zones.

In still other illustrative examples, two or more merge zones may be vertically offset but horizontally aligned. For example, two merge zones may be stacked on top of each other with zero, one, two, or some other number of plies between them. In some cases, these two merge zones may be "longitudinally offset" such that the locations of the overlaps and gaps in one merge zone are offset relative to the locations of the overlaps and gaps in the other merge zone along the length of the merge zones. In other cases, these two merge zones may simply be created such that the locations of the overlaps and gaps in one merge zone are not directly aligned vertically with the locations of respective overlaps and gaps in the other merge zone.

Control system 114 may control tow placement system 112 in FIG. 1 such that merge zones 504 are staggered in a manner that ensures a desired amount of overlap, while reducing the number and size of gaps between tow ends to within selected tolerances. In particular, the locations of merge zones 504 may be staggered through thickness 506 of composite laminate to ensure that gaps and overlaps are offset vertically and are not stacked on top of each other beyond tolerances.

In one illustrative example, the locations of merge zones 504 may be staggered through thickness 506 according to a random sequence rather than in sequential order. This type of random staggering may help reduce the likelihood that gaps and overlaps are stacked on top of each other within composite laminate 500. Merge zones 504 are staggered such that merge zones 504 are both horizontally and vertically offset relative to each other.

Further, the positioning of merge zones 504 relative to each other may be selected to provide a desired thickness throughout composite laminate 500. For example, the positioning of merge zones 504 may be selected to reduce thickness variations throughout composite laminate 500. Further, the positioning of merge zones 504 may be selected to provide a desired surface quality for the outer surface of composite laminate 500. For example, the staggering of merge zones 504 may help ensure that the surface of composite laminate 500 is substantially smooth or substantially flat.

In FIG. 5B, a top view of composite laminate 500 is depicted. The top view allows the offsets between merge zones 504 to be more clearly seen. Merge zones 504 may be located within merge region 508 of composite laminate 500. Merge region 508 may be a volumetric space within composite laminate 500 that includes all of merge zones 504. Merge region 508 may also be referred to as a convergence region or a convergence volume.

Although composite laminate 500 is shown with only plies for a baseline orientation being shown, composite laminate 500 may also have other plies having different orientations that do not have merge zones. For example, one or more plies having all tows oriented the same may be located between two plies, both of which have merge zones and thus two sections of tows, the two sections having different orientations.

In this illustrative example, tow placement system 112 in FIG. 1 may be controlled to lay up each of plies 502 such that the locations of merge zones 504 within composite laminate 500 are horizontally spaced apart (or spaced apart in a cross-sectional direction). The spacing between each horizontally adjacent pair may be equal or different, depending on the implementation.

For example, the spacing may be between about 0.2 inches and about 0.7 inches. In one illustrative example, the spacing may be about 0.25 inches between each horizontally adjacent pair of merge zones 504. In some illustrative examples, the spacing may be about 0.5 inches between each horizontally adjacent pair of merge zones 504.

In this illustrative example, merge zones 504 are positioned offset relative to centerline 510 of composite laminate 500. In other illustrative examples, however, at least one of merge zones 504 may lie substantially along centerline 510. Although merge zones 504 are shown as being substantially parallel relative to each other, in other examples, at least a portion of merge zones 504 may be non-parallel relative to each other. For example, two or more merge zones 504 may crisscross or otherwise horizontally intersect relative to a horizontal plane.

Merge zones 504 include merge zones 512-526. These merge zones may be vertically ordered from bottom to top beginning with merge zone 512, merge zone 514, merge zone 516, merge zone 518, merge zone 520, merge zone 522, merge zone 524, and merge zone 526. These merge zones are staggered vertically in a random manner. Although in other illustrative examples, merge zones 504 may be staggered according to some preselected sequence.

Figure 6:
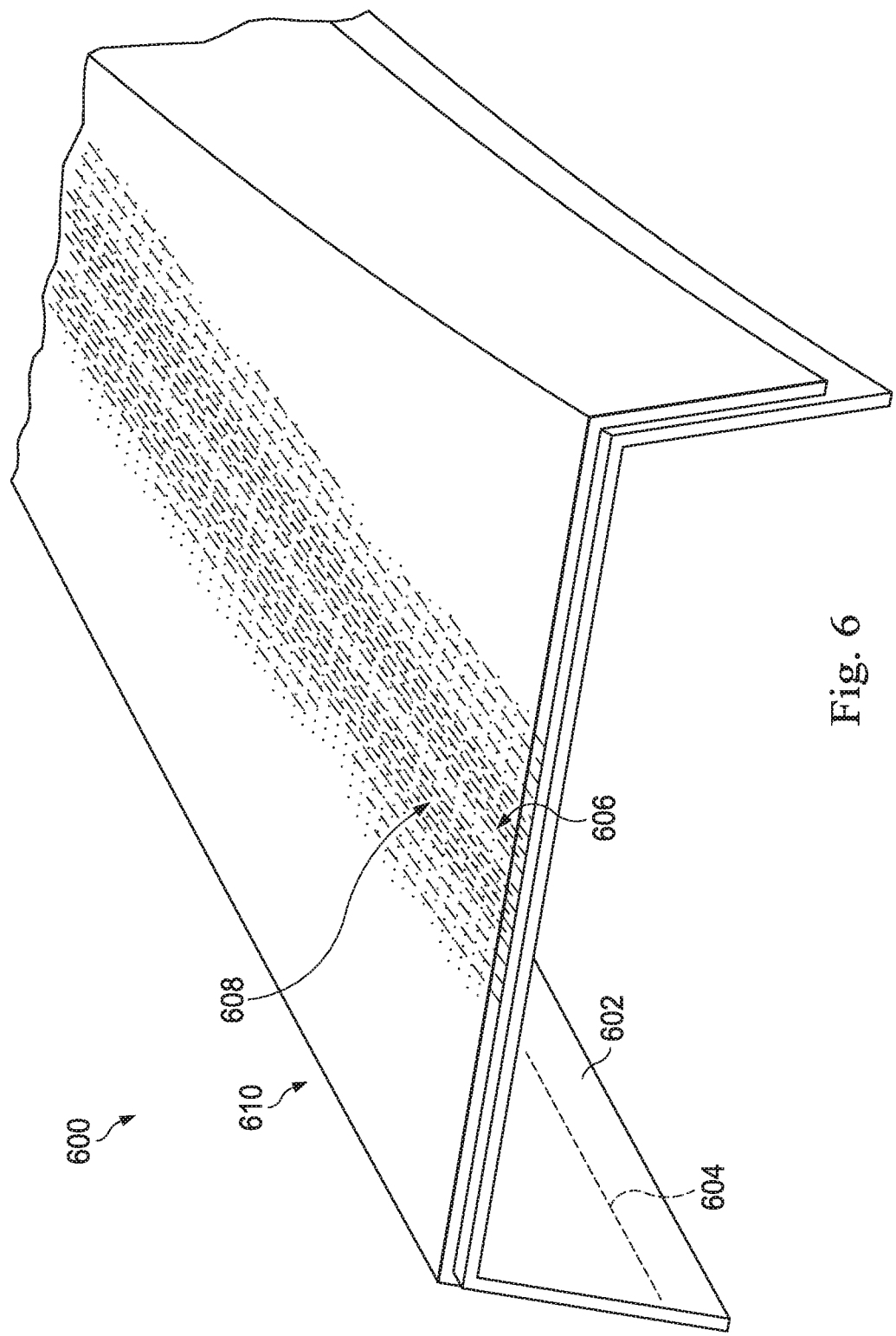
FIG. 6 is an illustration of a portion of a model of a composite laminate in accordance with an illustrative embodiment.

With reference now to FIG. 6, an illustration of a portion of a model of a composite laminate is depicted in accordance with an illustrative embodiment. Model 600 may be a three-dimensional model of, for example, composite laminate 500 from FIG. 5. Model 600 may have been generated prior to the manufacturing of composite laminate 500.

Model 600 includes tool 602 and composite laminate 604. Composite laminate 604 includes merge region 606. Model 600 may be created to identify (or predict) the locations of inconsistencies 608 in composite laminate 500. For example, model 600 may be built up in a same manner as composite laminate 500, ply by ply. Inconsistencies 608 may be present within merge region 606. Inconsistencies 608 may include overlaps, gaps, other types of inconsistencies, or a combination thereof.

In one illustrative example, as each ply is added to model 600, the locations of any overlaps and gaps formed in that ply are identified and recorded. These locations are then used to determine where to locate the merge zone of the next ply to avoid a stacking up of the overlaps and gaps. The location of the merge zone of the next ply may be shifted by modifying, for example, where the ends of the tows of each section used to form the ply are trimmed, how the paths along which the tows of each section are laid up over tool 602, or a combination thereof. In other illustrative examples, the location of the merge zone may be shifted in some other manner.

Figure 7:
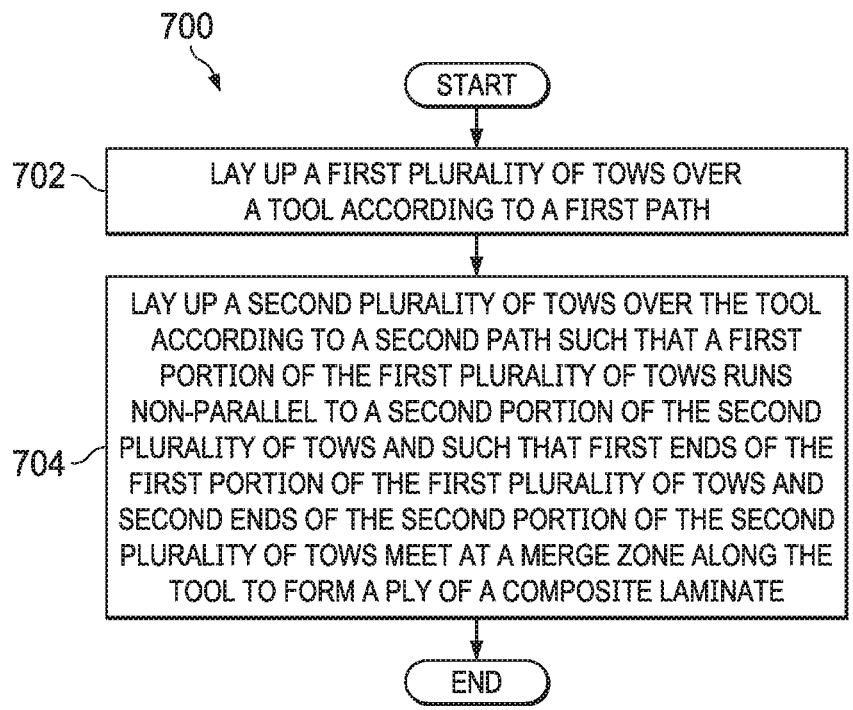
FIG. 7 is a flowchart of a process for forming a composite object in accordance with an illustrative embodiment.

With reference now to FIG. 7, a flowchart of a process for forming a composite object is depicted in accordance with an illustrative embodiment. Process 700 illustrated in FIG. 7 may be implemented using, for example, composite manufacturing system 108 described in FIG. 1 to form composite object 104. Specifically, process 700 illustrated in FIG. 7 may be used to form composite laminate 102 that is used to form composite object 104.

Process 700 may begin by laying up first plurality of tows 126 over tool 116 according to first path 130 (operation 702). Next, second plurality of tows 128 is laid up over tool 116 according to second path 132 such that first portion 134 of first plurality of tows 126 runs non-parallel to second portion 135 of second plurality of tows 128 and such that first ends 138 of first portion 134 of first plurality of tows 126 and second ends 140 of second portion 135 of second plurality of tows 128 meet at merge zone 142 along tool 116 to form ply 124 of composite laminate 102 (operation 704), with the process terminating thereafter.

Process 700 described above may be repeated any number of times to form any number of plies for composite laminate 102. Each time process 700 is performed for a different ply in composite laminate 102, one or both of first path 130 and second path 132 may be the same or different from the previous iteration of process 700.

In these illustrative examples, composite laminate 102 may be used to form composite object 104. In some cases, composite object 104 may take the form of spar 106. In other illustrative examples, composite object 104 may take the form of a beam, a frame, a rib, an intercostal, a stringer, a wing structure, a fuselage structure, a stabilizer structure, a blade, some other composite aircraft structure, or some other type of composite structure.

Figure 8:
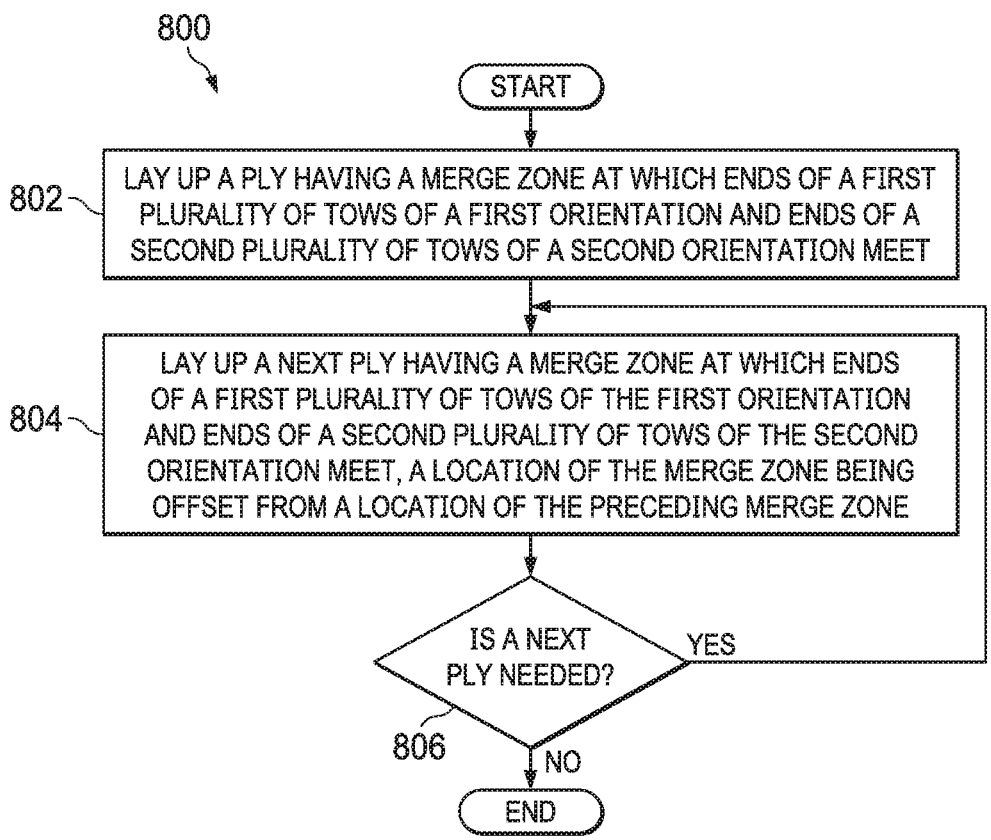
FIG. 8 is a flowchart of a process for forming a composite laminate in accordance with an illustrative embodiment.

With reference now to FIG. 8, a flowchart of a process for forming a composite object is depicted in accordance with an illustrative embodiment. Process 800 illustrated in FIG. 8 may be implemented using, for example, composite manufacturing system 108 described in FIG. 1 to form composite laminate 102 that is used to form composite object 104.

Process 800 may begin by laying up a ply having a merge zone at which ends of a first plurality of tows of a first orientation and ends of a second plurality of tows of a second orientation meet (operation 802). Operation 802 may be performed based on the information and/or instructions provided in a layup plan, such as layup plan 154 in FIG. 1. Layup plan 154 identifies the first orientation for the first plurality of tows and the second orientation for the second plurality of tows. Further, layup plan 154 identifies where the tow ends of the first plurality of tows and the tow ends of the second plurality of tows are cut such that the merge zone is created at a selected location and with a desired amount of overlaps and gaps.

Thereafter, a next ply is laid up having a merge zone at which ends of a first plurality of tows of the first orientation and ends of a second plurality of tows of the second orientation meet, a location of the merge zone being offset from a location of the preceding merge zone (operation 804). In operation 804, the two merge zones may be considered staggered relative to each other. Layup plan 154 determines the location for the second merge zone formed at operation 804.

In one or more embodiments, merge zones may be offset relative to each other by being at least one of horizontally offset, vertically offset, or angularly offset relative to each other. Two merge zones may be angularly offset by having different orientations relative to each other. In some embodiments, layup plan 154 determines how the merge zones are offset or staggered and determines how the merge zones are located relative to a centerline of the tool and with respect to a neutral axis of the composite object to be formed.

A determination is then made as to whether a next ply is needed to complete the composite laminate (operation 806). If a next ply is not needed, the process terminates. Otherwise, the process returns to operation 804 described above. With each repeat of operation 804, the merge zone of the current ply formed is offset relative to the previous merge zone formed. In this manner, the merge zones of the various plies within the composite laminate may be staggered in the horizontal direction such that the gaps and overlaps within each merge zone are not stacked on top of each other.

Figure 9:
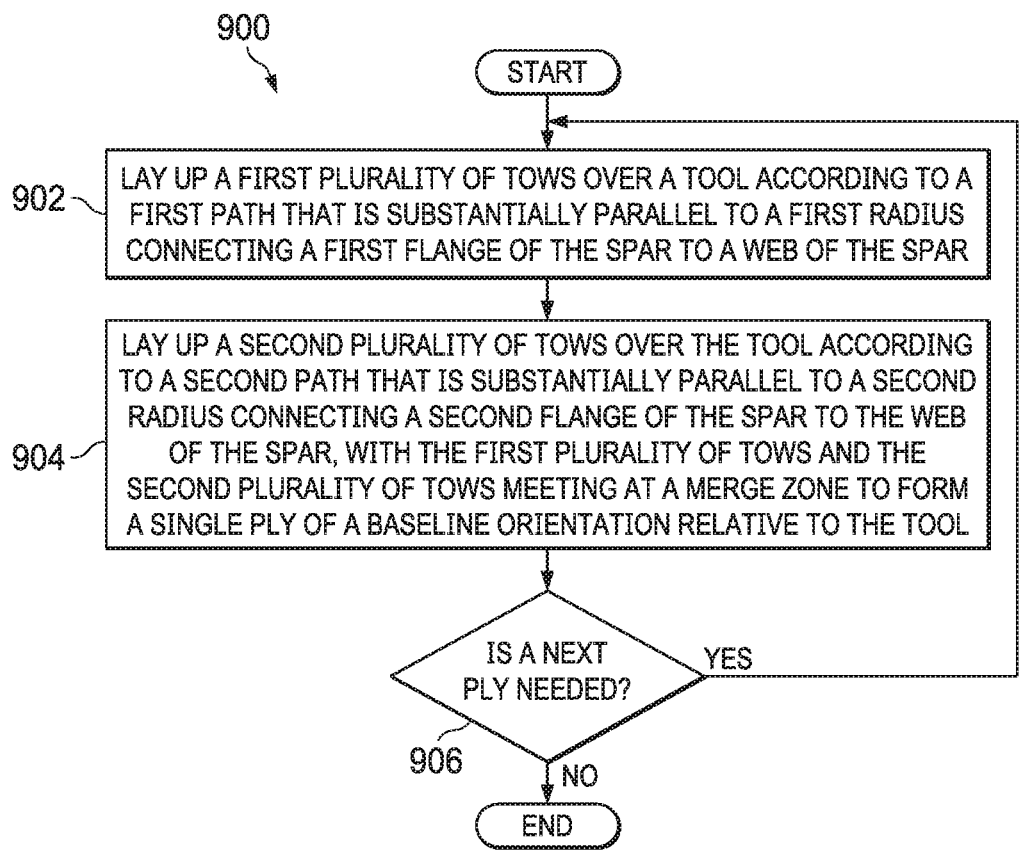
FIG. 9 is a flowchart of a process for forming a spar in accordance with an illustrative embodiment.

With reference now to FIG. 9, a flowchart of a process for forming a composite laminate for a spar is depicted in accordance with an illustrative embodiment. Process 900 illustrated in FIG. 9 may be implemented using, for example, composite manufacturing system 108 described in FIG. 1 to form composite laminate 102 for spar 106 in FIG. 1.

Process 900 may begin by laying up a first plurality of tows over a tool according to a first path that is substantially parallel to a first radius connecting a first flange of the spar to a web of the spar (operation 902). Then, a second plurality of tows is laid up over the tool according to a second path that is substantially parallel to a second radius connecting a second flange of the spar to the web of the spar, with the first plurality of tows and the second plurality of tows meeting at a merge zone to form a single ply of a baseline orientation relative to the tool (operation 904). The first radius and the second radius may run non-parallel.

A determination is then made as to whether a next ply is needed to complete the composite laminate (operation 906). If a next ply is not needed, the process terminates. Otherwise, the process returns to operation 902 as described above. With each repeat of this process, a new ply with a new merge zone is created. The locations of the different merge zones for the different plies may be staggered relative to each other through the thickness of the composite laminate in both the horizontal and vertical directions.

In process 900 described above, all plies of the composite laminate are formed with a baseline orientation and having a merge zone. In other illustrative examples, process 900 may optionally include additional steps that result in the layup of one or more other plies between the plies having merge zones. These other plies may each be laid up so that all tows of the ply follow a same orientation. For example, a first ply having a 45-degree orientation relative to the tool, a second ply having a 90-degree orientation relative to the tool, and a third ply having a −45-degree orientation relative to the tool may be laid up in between two baseline plies having the baseline orientation and merge zones.

Figure 10:
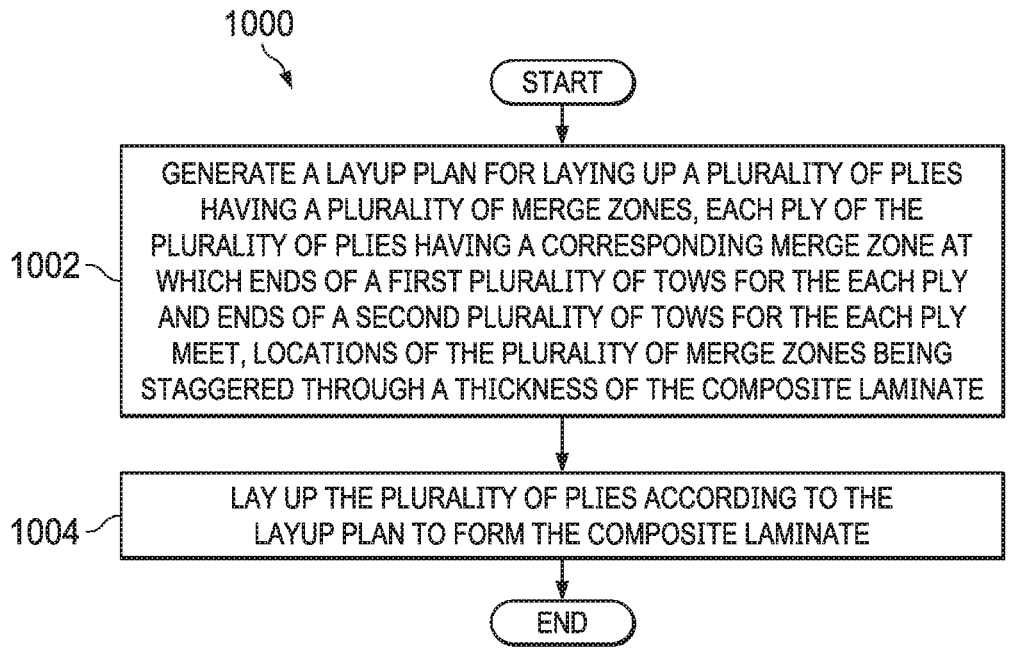
FIG. 10 is a flowchart of a process for generating a program for building a composite laminate in accordance with an illustrative embodiment.

With reference now to FIG. 10, a flowchart of a process for generating a program for building a composite laminate is depicted in accordance with an illustrative embodiment. Process 1000 illustrated in FIG. 10 may be implemented using, for example, composite manufacturing system 108 described in FIG. 1 to build composite laminate 102.

Process 1000 begins by generating a layup plan for laying up a plurality of plies having a plurality of merge zones (operation 1002). Next, the plurality of plies is laid up having the plurality of merge zones to form a composite laminate, each of the plurality of plies having a corresponding merge zone at which ends of a first plurality of tows of a first orientation and ends of a second plurality of tows of a second orientation meet, wherein locations of the plurality of merge zones are staggered through a thickness of the composite laminate (operation 1004), with the process terminating thereafter.

Layup plan 154 in FIG. 1 is an example of a layup plan that may be generated at operation 1002. Layup plan 154 may identify and/or take into account various parameters such as those described below. Layup plan 154 may identify the locations for merge zones relative to the centerline of the tool and the neutral axis for the composite object to be performed based on any one or combination of the parameters described below.

Part surface area is a parameter that may be used to determine the total area available for spacing merge zones. Layup plan 154 may take into account the ratio of the location of the smallest part width to the number of plies with merge zones. The location of the smallest part width identifies the "bottleneck" region that may affect how the merge zones are spaced and the maximum spacing allowed.

Layup plan 154 identifies the total number of plies to be included in the composite laminate for use in determining the number of merge zones that need to be staggered. Material width and overlap amount may be used to determine the number of and/or sizing of the gaps and overlaps in the merge zone. The overlap amount may be, for example, a percentage of the material width.

Further, layup plan 154 includes and takes into account a total merge zone width, which may be the linear distance that the gaps and overlaps can extend on each side of the boundary or seam within the merge zone. For example, without limitation, each tow may be about 0.5 inches and layup plan 154 may be based on a requirement of about 50% overlap within the merge zone. Based on these parameters, the total merge zone width may be about one inch. In other words, the merge zone may extend about 0.5 inches on each side from the merge boundary. Also identified by layup plan 154 is the merge zone spacing, which determines, based on the above-described parameters, the maximum horizontal spacing allowed between merge zones given the part surface area.

Layup plan 154 identifies a sequence for the merge zones, which may be the order or sequence in which the merge zone locations are selected for each baseline ply in the composite laminate. Further, layup plan 154 takes into account the degree of gaps and overlaps that are present throughout the composite laminate. The degree of gaps and overlaps may be measured based on area per ply and/or volume within the composite laminate. Layup plan 154 may be generated to optimize the degree of gaps and overlaps to reduce or minimize deviations in the total thickness of the composite laminate due to the stacking of gaps and overlaps. Layup plan 154 may also identify the total area of gaps and overlaps present in each merge zone for use in performing structural analysis of the composite object to be formed from the composite laminate manufactured according to layup plan 154.

Figure 11:
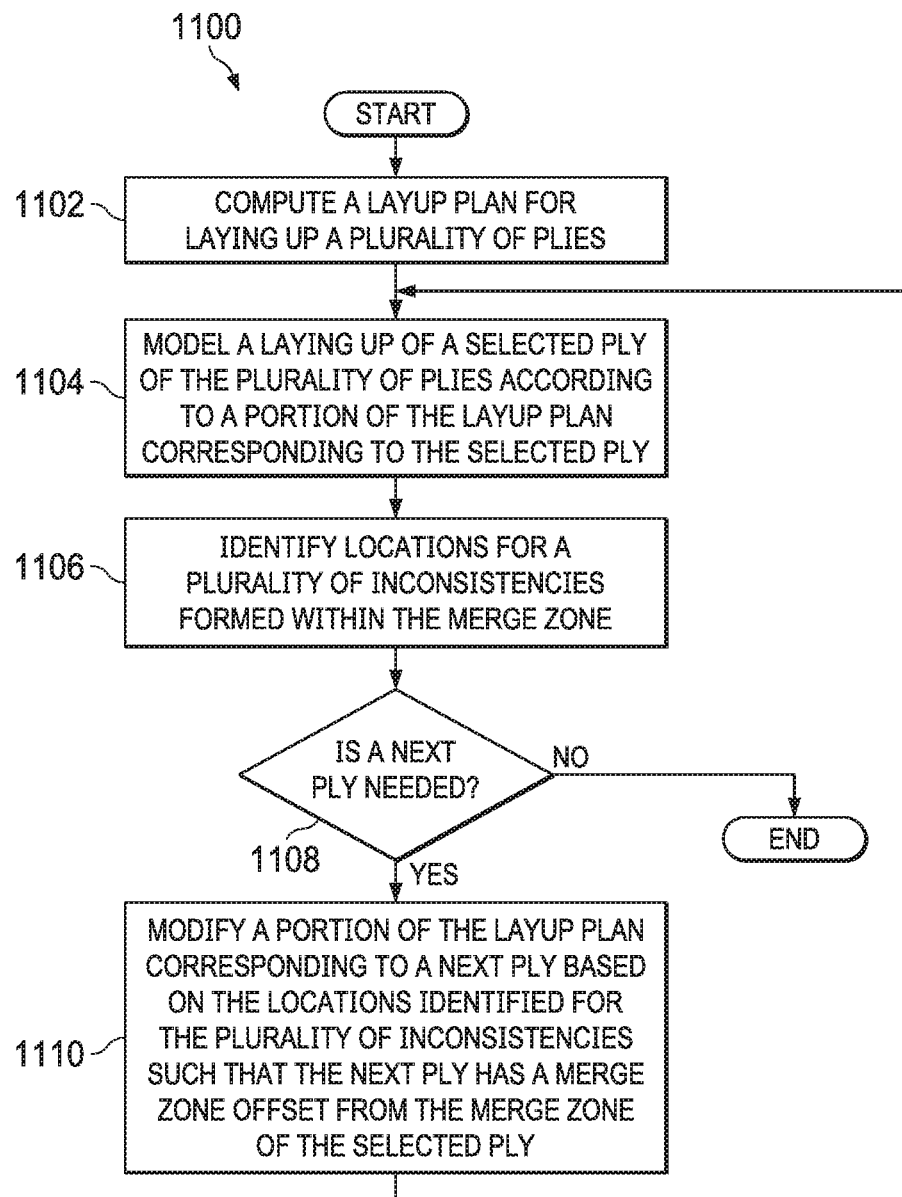
FIG. 11 is a flowchart of a process for generating a layup plan for forming a composite laminate in accordance with an illustrative embodiment.

With reference now to FIG. 11, a flowchart of a process for generating a layup plan for forming a composite laminate is depicted in accordance with an illustrative embodiment. Process 1100 illustrated in FIG. 11 may be implemented using, for example, control system 114 in FIG. 1 to generate layup plan 154 in FIG. 1. Process 1100 may be used to implement operation 1002 described in FIG. 10.

Process 1100 may begin by computing a layup plan for laying up a plurality of plies (operation 1102). In one illustrative example, the layup plan, which may be layup plan 154 in FIG. 1, may be for laying up plies of a baseline orientation relative to a tool. A portion of layup plan 154 corresponding to a particular ply of the plurality of plies includes a first path for laying up a first plurality of tows and a second path for laying up a second plurality of tows to form the particular ply. The first path and the second path may be non-parallel.

Next, a laying up of a selected ply according to portion of the layup plan corresponding to the selected ply is modeled (operation 1104). At operation 1104, the selected ply is laid up such that the selected ply has a merge zone at which first ends of the first plurality of tows and second ends of the second plurality of tows meet. Model 600 may be an example of one implementation for the model being built at operation 1104.

Locations for a plurality of inconsistencies formed within the merge zone are then identified (operation 1106). This plurality of inconsistencies may include, for example, gaps between ends of the tows, overlaps of the ends of the tows, or both.

A determination is then made as to whether a next ply is needed to complete the composite laminate (operation 1108). If a next ply is not needed, the process terminates with a final layup plan having been generated that optimizes selected parameters. Otherwise, the process proceeds to operation 1110 as described below.

A portion of the layup plan corresponding to a next ply is modified based on the locations identified for the plurality of inconsistencies such that the next ply has a merge zone offset from the merge zone of the selected ply (operation 1110). The process then returns to operation 1104 described above using the modified layup plan generated at operation 1110.

At operation 1110, the modified layup plan ensures that the merge zone of the next ply is not stacked up on the merge zone of the current ply. In particular, the modified layup plan ensures that the plurality of inconsistencies that will be formed in the merge zone of the next ply is not stacked up over the plurality of inconsistencies within the merge zone of the current ply.

In operation 1110, the portion of the layup plan corresponding to the next ply may be modified by altering, for example, without limitation, at least one of total applied bandwidth, angular path variation, trace path variations, ply boundaries, or some other type of factor. Modifying the layup plan may include altering the locations at which the ends of the first plurality of tows and the ends of the second plurality of tows are to be trimmed against each other, to thereby alter the location of the merge zone to be formed.

In some illustrative examples, modifying the layup plan may include offsetting certain overlaps and gaps within the merge zone of the next ply longitudinally (e.g., along a length of the merge zone) with respect to certain overlaps and gaps within the current ply. These two merge zones may be considered "longitudinally offset" in the sense that the overlaps in the two merge zones may be offset and the gaps in the two merge zones may be offset.

The process described in FIG. 11 ensures that the final layup plan or program generated results in the composite laminate having staggered merge zones horizontally and vertically. In this manner, undesired thickness variations within the composite laminate may be reduced or minimized. In some cases, the locations for the merge zones may be selected based on selected locations for thickness variations in the composite laminate. The locations for the thickness variations in the composite laminate may be selected based on a neutral axis of the composite object to be formed.

In some illustrative examples, the final layup plan ensures that the thickness variations in the composite laminate are less than a selected threshold. For example, the final layup plan may be generated such that the expected thickness variations in the composite laminate are within about 0.1 inches, 0.25 inches, 0.5 inches, 0.05 inches, or some other value relative to a selected thickness for the composite laminate. In some cases, the requirements may require the composite laminate have a substantially smooth surface with thickness variations less than 0.001 inches, 0.005 inches, 0.02 inches, 0.03 inches, or some other value relative to a selected thickness for the composite laminate.

Figure 12:
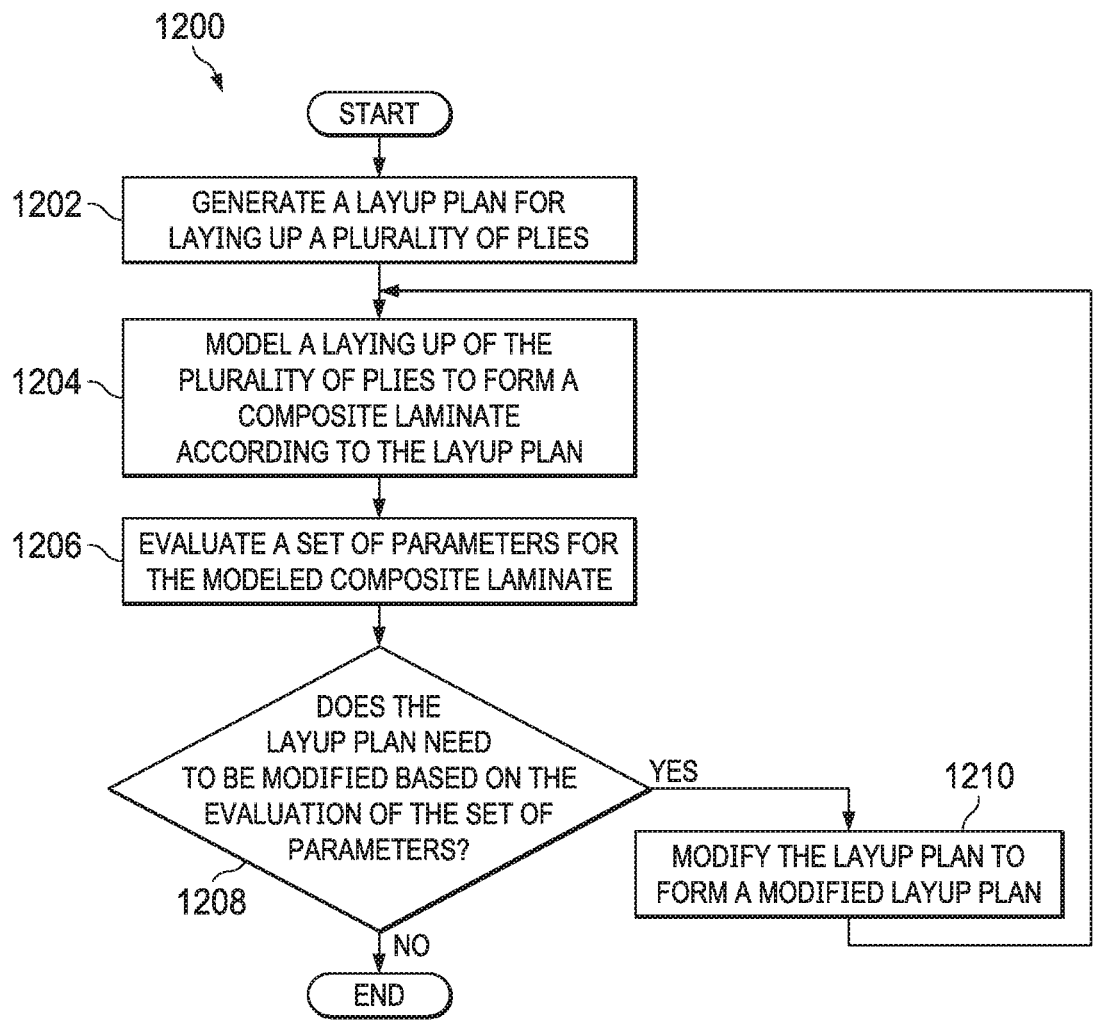
FIG. 12 is a flowchart of a process for generating a layup plan in accordance with an illustrative embodiment.

With reference now to FIG. 12, a flowchart of a process for generating a layup plan is depicted in accordance with an illustrative embodiment. Process 1200 illustrated in FIG. 12 may be implemented using, for example, control system 114 in FIG. 1 to generate layup plan 154 in FIG. 1. Process 1200 may be used to implement operation 1002 described in FIG. 10.

Process 1200 begins by generating a layup plan for laying up a plurality of plies (operation 1202). Next, a laying up of the plurality of plies to form a composite laminate is modeled according to the layup plan (operation 1204).

Thereafter, a set of parameters for the modeled composite laminate are evaluated (operation 1206). In operation 1206, the set of parameters may include, for example, a degree of overlaps and gaps within each baseline ply modeled, a surface quality of the composite laminate, thickness information for the composite information, structural parameters, a merge zone width, or a combination thereof.

A determination is then made as to whether the layup plan needs to be modified based on the evaluation of the set of parameters (operation 1208). If the layup plan does not need to be modified, process 1200 terminates. If, however, the layup plan does need to be modified, the process modifies the layup plan to generate a modified layup plan (operation 1210), with the process then returning to operation 1204 described above. Operation 1204 is then performed using the modified layup plan.

The modification of the layup plan in operation 1210 may include modifying the location for one or more merge zones. In some embodiments, the layup plan may be modified by changing the times or locations at which tow ends are cut during the layup of one or more particular plies within the composite laminate. The layup plan may be modified by modifying any of the parameters identified by or taken into account by the layup plan.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 13:
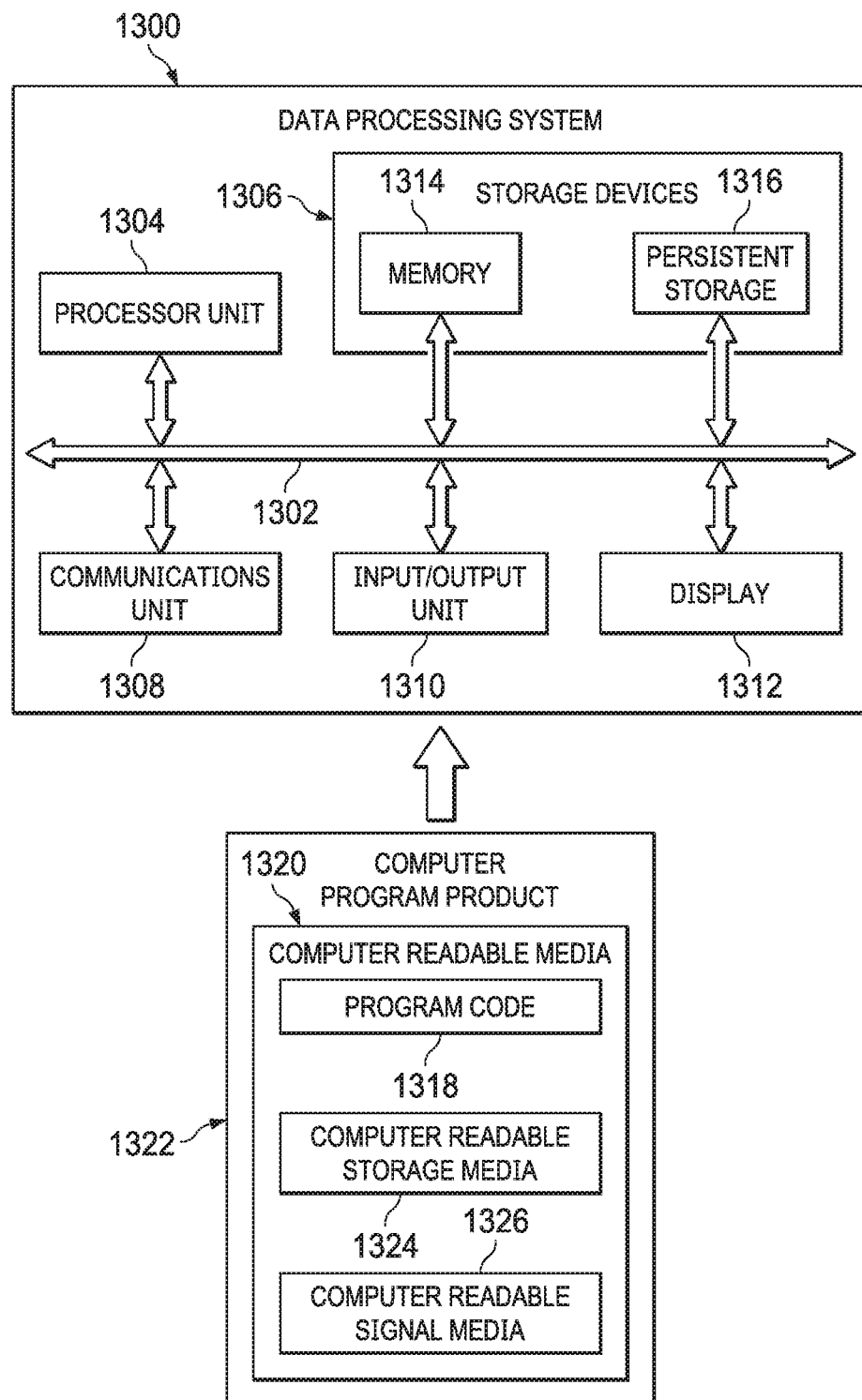
FIG. 13 is a block diagram of a data processing system in accordance with an illustrative embodiment.

Turning now to FIG. 13, an illustration of a data processing system in the form of a block diagram is depicted in accordance with an illustrative embodiment. Data processing system 1300 may be used to implement control system 114 and/or computer system 115 in FIG. 1. As depicted, data processing system 1300 includes communications framework 1302, which provides communications between processor unit 1304, storage devices 1306, communications unit 1308, input/output unit 1310, and display 1312. In some cases, communications framework 1302 may be implemented as a bus system.

Processor unit 1304 is configured to execute instructions for software to perform a number of operations. Processor unit 1304 may comprise a number of processors, a multiprocessor core, and/or some other type of processor, depending on the implementation. In some cases, processor unit 1304 may take the form of a hardware unit, such as a circuit system, an application specific integrated circuit (ASIC), a programmable logic device, or some other suitable type of hardware unit.

Instructions for the operating system, applications, and/or programs run by processor unit 1304 may be located in storage devices 1306. Storage devices 1306 may be in communication with processor unit 1304 through communications framework 1302. As used herein, a storage device, also referred to as a computer readable storage device, is any piece of hardware capable of storing information on a temporary and/or permanent basis. This information may include, but is not limited to, data, program code, and/or other information.

Memory 1314 and persistent storage 1316 are examples of storage devices 1306. Memory 1314 may take the form of, for example, a random access memory or some type of volatile or non-volatile storage device. Persistent storage 1316 may comprise any number of components or devices. For example, persistent storage 1316 may comprise a hard drive, a flash memory, a rewritable optical disk, a rewritable magnetic tape, or some combination of the above. The media used by persistent storage 1316 may or may not be removable.

Communications unit 1308 allows data processing system 1300 to communicate with other data processing systems and/or devices. Communications unit 1308 may provide communications using physical and/or wireless communications links.

Input/output unit 1310 allows input to be received from and output to be sent to other devices connected to data processing system 1300. For example, input/output unit 1310 may allow user input to be received through a keyboard, a mouse, and/or some other type of input device. As another example, input/output unit 1310 may allow output to be sent to a printer connected to data processing system 1300.

Display 1312 is configured to display information to a user. Display 1312 may comprise, for example, without limitation, a monitor, a touch screen, a laser display, a holographic display, a virtual display device, and/or some other type of display device.

In this illustrative example, the processes of the different illustrative embodiments may be performed by processor unit 1304 using computer-implemented instructions. These instructions may be referred to as program code, computer usable program code, or computer readable program code and may be read and executed by one or more processors in processor unit 1304.

In these examples, program code 1318 is located in a functional form on computer readable media 1320, which is selectively removable, and may be loaded onto or transferred to data processing system 1300 for execution by processor unit 1304. Program code 1318 and computer readable media 1320 together form computer program product 1322. In this illustrative example, computer readable media 1320 may be computer readable storage media 1324 or computer readable signal media 1326.

Computer readable storage media 1324 is a physical or tangible storage device used to store program code 1318 rather than a medium that propagates or transmits program code 1318. Computer readable storage media 1324 may be, for example, without limitation, an optical or magnetic disk or a persistent storage device that is connected to data processing system 1300.

Alternatively, program code 1318 may be transferred to data processing system 1300 using computer readable signal media 1326. Computer readable signal media 1326 may be, for example, a propagated data signal containing program code 1318. This data signal may be an electromagnetic signal, an optical signal, and/or some other type of signal that can be transmitted over physical and/or wireless communications links.

The illustration of data processing system 1300 in FIG. 13 is not meant to provide architectural limitations to the manner in which the illustrative embodiments may be implemented. The different illustrative embodiments may be implemented in a data processing system that includes components in addition to or in place of those illustrated for data processing system 1300. Further, components shown in FIG. 13 may be varied from the illustrative examples shown.

Figure 14:
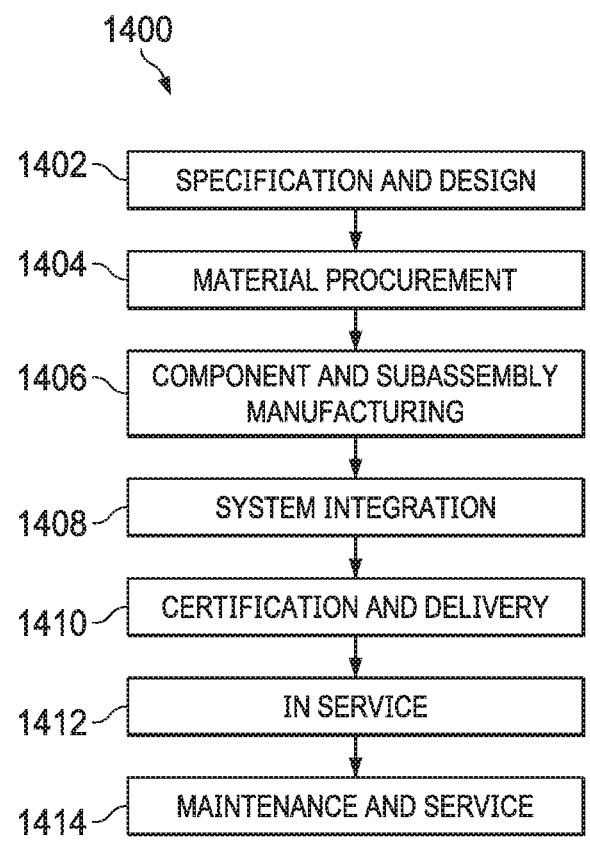
FIG. 14 is an illustration of an aircraft manufacturing and service method in accordance with an illustrative embodiment in accordance with an illustrative embodiment.
Figure 15:
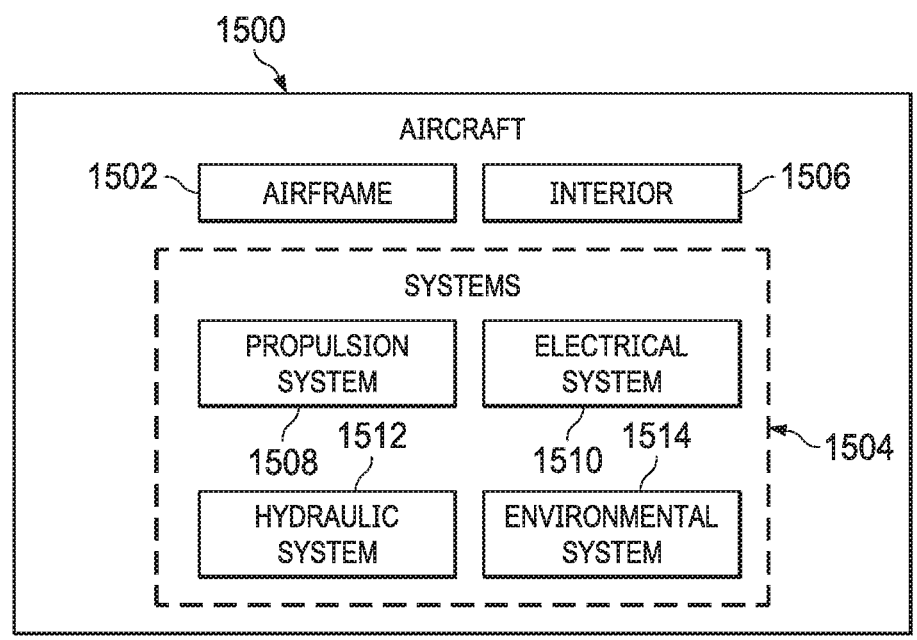
FIG. 15 is a block diagram of an aircraft in accordance with an illustrative embodiment.

Illustrative embodiments of the disclosure may be described in the context of aircraft manufacturing and service method 1400 as shown in FIG. 14 and aircraft 1500 as shown in FIG. 15. Turning first to FIG. 14, an illustration of an aircraft manufacturing and service method is depicted in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 in FIG. 15 takes place. Thereafter, aircraft 1500 in FIG. 15 may go through certification and delivery 1410 in order to be placed in service 1412. While in service 1412 by a customer, aircraft 1500 in FIG. 15 is scheduled for routine maintenance and service 1414, which may include modification, reconfiguration, refurbishment, and other maintenance or service.

Each of the processes of aircraft manufacturing and service method 1400 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of an aircraft is depicted in which an illustrative embodiment may be implemented. In this example, aircraft 1500 is produced by aircraft manufacturing and service method 1400 in FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1400 in FIG. 14. In particular, composite laminate 102 from FIG. 1 may be manufactured during any one of the stages of aircraft manufacturing and service method 1400. For example, without limitation, composite laminate 102 may be formed during at least one of component and subassembly manufacturing 1406, system integration 1408, routine maintenance and service 1414, or some other stage of aircraft manufacturing and service method 1400. Further, composite laminate 102 may be used to form a structure or other object that is part of airframe 1502 or interior 1506 of aircraft 1500.

In one illustrative example, components or subassemblies produced in component and subassembly manufacturing 1406 in FIG. 14 may be fabricated or manufactured in a manner similar to components or subassemblies produced while aircraft 1500 is in service 1412 in FIG. 14. As yet another example, one or more apparatus embodiments, method embodiments, or a combination thereof may be utilized during production stages, such as component and subassembly manufacturing 1406 and system integration 1408 in FIG. 14. One or more apparatus embodiments, method embodiments, or a combination thereof may be utilized while aircraft 1500 is in service 1412 and/or during maintenance and service 1414 in FIG. 14. The use of a number of the different illustrative embodiments may substantially expedite the assembly of and/or reduce the cost of aircraft 1500.

Thus, the different illustrative embodiments provide a method and apparatus laying up a baseline orientation (e.g., 0 degree orientation) ply relative to non-parallel contours (e.g., over a shape having non-parallel bends or tight radii). The ply may be created by laying up two different sections of tows in two different, non-parallel directions such that the ends of the tows of the two sections converge at a merge zone.

For example, a first plurality of tows may be laid up substantially parallel to a first contour (e.g., a first radius) of a spar and a second plurality of tows may be laid up substantially parallel to a second contour (e.g., a second radius) of the spar. The first contour and the second contour may be non-parallel. The first contour may be at the interface between a first flange and the web of the spar. The second contour may be at the interface between a second flange and the web of the spar. By having the tows be substantially parallel to the flange-web interfaces, increased tension strength may be provided at these interfaces. Using the methods and systems described above, the tows may be steered to follow tight radii even when the tight radii do not follow a straight and linear path.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required. For example, without limitation, "at least one of item A, item B, or item C" or "at least one of item A, item B, and item C" may mean item A; item A and item B; item B; item A, item B, and item C; item B and item C; or item A and C. In some cases, "at least one of item A, item B, or item C" or "at least one of item A, item B, and item C" may mean, but is not limited to, two of item A, one of item B, and ten of item C; four of item B and seven of item C; or some other suitable combination.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The invention claimed is:

1. A method for forming a composite laminate, the method comprising:
   generating a layup plan for laying up a plurality of plies having a plurality of merge zones, each ply of the plurality of plies having a corresponding merge zone in which first ends of a first plurality of tows and second ends of a second plurality of tows converge at a merge zone to form a ply, locations of the plurality of merge zones being offset relative to each other through a thickness of the composite laminate; and
   laying up the plurality of plies according to the layup plan to form the composite laminate.

2. The method of claim 1, wherein generating the layup plan comprises:
   computing a first path for laying up the first plurality of tows and a second path for laying up the second plurality of tows for forming a selected ply of the plurality of plies.

3. The method of claim 1, wherein the locations of at least two merge zones of the plurality of merge zones are vertically offset relative to each other and at least one of horizontally offset or angularly offset relative to each other.

4. The method of claim 1, wherein generating the layup plan comprises:
   computing a first path for laying up the first plurality of tows for a selected ply and a second path for laying up the second plurality of tows for the selected ply, wherein the first path and the second path are at least one of non-parallel or nonlinear and wherein the first plurality of tows and the second plurality of tows form the selected ply having a baseline orientation.

5. The method of claim 4, wherein generating the layup plan comprises:
   modeling a laying up of the selected ply according to the layup plan such that the selected ply has a merge zone at which ends of the first plurality of tows and ends of the second plurality of tows meet to thereby form the selected ply having the baseline orientation.

6. The method of claim 5, wherein generating the layup plan further comprises:
   identifying a plurality of overlaps of the ends of the second plurality of tows with the ends of the first plurality of tows within the merge zone of the selected ply.

7. The method of claim 6, wherein generating the layup plan further comprises:
   identifying a plurality of gaps between the ends of the second plurality of tows with the ends of the first plurality of tows formed within the merge zone of the selected ply.

8. The method of claim 7, wherein generating the layup plan further comprises:
   modifying the layup plan based on the plurality of overlaps and the plurality of gaps identified such that a next ply has a merge zone offset from the merge zone of the selected ply.

9. The method of claim 8, wherein modifying the layup plan comprises:
   computing a first path for laying up the first plurality of tows for the next ply and a second path for laying up the second plurality of tows for the next ply such that the merge zone of the next ply is offset from the merge zone of the selected ply.

10. The method of claim 1, wherein generating the layup plan comprises:
    generating the layup plan for the plurality of plies, wherein the plurality of plies includes a plurality of baseline plies designated for a baseline orientation relative to a tool and a plurality of other plies designated for different orientations relative to the tool, wherein the plurality of baseline plies have the plurality of merge zones, and wherein various merge zones of the plurality of merge zones are vertically offset relative to each other and at least one of horizontally offset or angularly offset relative to each other.

11. The method of claim 1, wherein generating the layup plan comprises:
    generating the layup plan such that at least two merge zones of the plurality of merge zones are horizontally offset with a spacing of between about 0.2 inches and about 0.8 inches, wherein the at least two merge zones are either adjacent to each other or separated by one or more other plies within the composite laminate.

12. The method of claim 1, wherein generating the layup plan comprises:
    generating the layup plan such that at least two merge zones of the plurality of merge zones are vertically offset such that overlaps and gaps within the at least two merge zone are not directly stacked on top of each other within the composite laminate, wherein the at least two merge zones are either adjacent to each other or separated by one or more other plies within the composite laminate.

13. The method of claim 1, wherein laying up the plurality of plies comprises:
    laying up the plurality of plies according to the layup plan using an automated fiber placement system.

14. The method of claim 1, wherein generating the layup plan comprises:
    generating the layup plan such that the composite laminate formed using the layup plan has variations in thickness less than about 0.5 inches relative to a selected thickness for the composite laminate.

15. The method of claim 1, wherein the generating step is performed using a computer system and wherein the laying up step is performed using a tow placement system.

16. The method of claim 1, wherein a first merge zone and a second merge zone of the plurality of merge zones are vertically aligned and wherein first locations of first overlaps and first gaps in the first merge zone are offset from second locations of respective second overlaps and second gaps in the second merge zone.

17. A method for forming a composite laminate, the method comprising:

computing a layup plan for laying up a plurality of plies, a portion of the layup plan corresponding to a selected ply of the plurality of plies including a first path for laying up a first plurality of tows and a second path for laying up a second plurality of tows, the first path and the second path being at least one of non-parallel or nonlinear;

modeling a laying up of the first plurality of tows according to the first path and the second plurality of tows according to the second path to thereby form the selected ply having a merge zone at which first ends of the first plurality of tows and second ends of the second plurality of tows meet;

identifying overlaps of the first ends and the second ends and gaps between the first ends and the second ends formed within the merge zone of the selected ply; and modifying a portion of the layup plan corresponding to a next ply based on the overlaps and the gaps identified such that the next ply has a merge zone offset from the merge zone of the selected ply.

18. The method of claim 17, wherein modifying the layup plan comprises:

computing a first path for laying up a first plurality of tows for the next ply and a second path for laying up a second plurality of tows for the next ply such that the merge zone of the next ply is offset from the merge zone of the selected ply, wherein the next ply and the selected ply are adjacent to each other.

19. The method of claim 17, further comprising:

repeating the computing, modeling, identifying, and modifying steps to thereby form a plurality of plies for a composite laminate, the plurality of plies having a plurality of merge zones that is staggered horizontally and vertically within a merge region of the composite laminate.

20. The method of claim 19, wherein at least two merge zones of the plurality of merge zones are horizontally offset with a spacing of between about 0.2 inches and about 0.8 inches, and wherein the at least two merge zones are either adjacent to each other or separated by one or more other plies within the composite laminate.

21. The method of claim 17, wherein the method is performed using a computer system.

22. A system comprising:

a control system configured to generate a layup plan for laying up a plurality of plies having a plurality of merge zones, each ply of the plurality of plies having a corresponding merge zone in which first ends of a first plurality of tows and second ends of a second plurality of tows converge at a merge zone to form a ply, locations of the plurality of merge zones being offset relative to each other through a thickness of a composite laminate to be formed; and a tow placement system configured to be controlled by the control system to lay up the plurality of plies according to the layup plan to form the composite laminate.

23. The system of claim 22, wherein the control system is further configured to generate the layup plan such that locations of at least two merge zones of the plurality of merge zones are vertically offset relative to each other and at least one of horizontally offset or angularly offset relative to each other.

24. The system of claim 22, wherein the control system is further configured to generate the layup plan such that at least two merge zones of the plurality of merge zones are horizontally offset with a spacing of between about 0.2 inches and about 0.8 inches, wherein the at least two merge zones are either adjacent to each other or separated by one or more other plies within the composite laminate.

25. The system of claim 22, wherein the control system is further configured to generate the layup plan such that at least two merge zones of the plurality of merge zones are vertically offset such that overlaps and gaps within the at least two merge zone are not directly stacked on top of each other within the composite laminate, and wherein the at least two merge zones are either adjacent to each other or separated by one or more other plies within the composite laminate.

26. The system of claim 22, wherein when the composite laminate to be formed is a spar, the control system is further configured to generate the layup plan such that the plurality of merge zones is staggered with respect to a centerline for the spar.

27. The system of claim 22, wherein the control system is further configured to generate the layup plan such that the layup plan for a selected ply includes a first path for laying up the first plurality of tows for the selected ply, the first path being substantially parallel to a first contour of a tool.

28. The system of claim 27, wherein the control system is further configured to generate the layup plan such that the layup plan for the selected ply includes a second path for laying up the second plurality of tows for the selected ply, the second path being substantially parallel to a second contour of the tool, wherein the first contour and the second contour are at least one of non-parallel or nonlinear.

29. The system of claim 28, wherein the control system is further configured to generate the layup plan based on the first contour and the second contour, the first contour being a first radius at which a first flange and a web of a spar meet and the second contour being a second radius at which a second flange and the web of the spar meet.

30. The system of claim 22, wherein the control system is further configured to generate the layup plan such that the ends of the first plurality of tows and the ends of the second plurality of tows overlap by between about 50 percent within the corresponding merge zone.

31. The system of claim 22, wherein the control system is further configured to generate the layup plan such that the plurality of plies includes a plurality of baseline plies designated for a baseline orientation relative to a tool and a plurality of other plies designated for different orientations relative to the tool; and wherein the plurality of baseline plies has the plurality of merge zones.

32. The system of claim 31, wherein the control system is further configured to generate the layup plan such that various merge zones of the plurality of merge zones are vertically offset relative to each other and at least one of horizontally offset or angularly offset relative to each other.

33. The system of claim 22, wherein the control system is further configured to generate the layup plan such that a first merge zone and a second merge zone of the plurality of merge zones are vertically aligned and wherein first locations of first overlaps and first gaps in the first merge zone are offset from second locations of respective second overlaps and second gaps in the second merge zone.

\* \* \* \* \*